(12) United States Patent
D'Souza et al.

(10) Patent No.: US 12,002,079 B2
(45) Date of Patent: *Jun. 4, 2024

(54) METHOD, SYSTEM, AND NON-TRANSITORY COMPUTER READABLE MEDIUM FOR PROVIDING PRODUCT IMAGE RECOMMENDATIONS

(71) Applicant: SHOPIFY INC., Ottawa (CA)

(72) Inventors: Franklyn D'Souza, Toronto (CA); Jonathan Wade, Ottawa (CA); Juho Mikko Haapoja, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,233

(22) Filed: Jun. 9, 2022

(65) Prior Publication Data
US 2022/0301032 A1   Sep. 22, 2022

Related U.S. Application Data

(63) Continuation of application No. 16/662,211, filed on Oct. 24, 2019, now Pat. No. 11,386,473.

(51) Int. Cl.
*G06Q 30/00* (2023.01)
*G06Q 30/0601* (2023.01)

(52) U.S. Cl.
CPC ..... *G06Q 30/0627* (2013.01); *G06Q 30/0609* (2013.01); *G06Q 30/0631* (2013.01); *G06Q 30/0643* (2013.01)

(58) Field of Classification Search
CPC . G06Q 30/0601–0645; G06Q 30/0609; G06Q 30/0627; G06Q 30/0631; G06Q 30/0643
See application file for complete search history.

(56) References Cited

U.S. PATENT DOCUMENTS

| 10,360,623 B2 | 7/2019 | Duponchel et al. |
| 2014/0104379 A1 | 4/2014 | Glasgow |

(Continued)

FOREIGN PATENT DOCUMENTS

| CN | 104145474 A | 11/2014 |
| CN | 104284074 A | 1/2015 |

(Continued)

OTHER PUBLICATIONS

Di, Wei, et al. "Is a picture really worth a thousand words?—on the role of images in e-commerce." Proceedings of the 7th ACM international conference on Web search and data mining. 2014. (Year: 2014).*

(Continued)

*Primary Examiner* — Michael Misiaszek
*Assistant Examiner* — Kennedy Gibson-Wynn

(57) ABSTRACT

For products that are sold online, the manner in which a product is displayed in an image can affect sales of the product. Embodiments of the present disclosure relate to computer-implemented systems and methods to provide a user with recommendations when generating an image of a product. A method includes obtaining a product image and determining parameters of the product image. A recommendation for modifying the product image is then generated using a model to relate these parameters to market success of the product image. The recommendation is displayed on the user device, and a user can potentially improve subsequent product images by following the recommendation.

20 Claims, 15 Drawing Sheets

(56) References Cited

U.S. PATENT DOCUMENTS

| | | | |
|---|---|---|---|
| 2016/0026866 A1 | 1/2016 | Sundaresan | |
| 2016/0142625 A1* | 5/2016 | Weksler | G06V 20/10 |
| | | | 348/222.1 |
| 2016/0253582 A1 | 9/2016 | Di et al. | |
| 2016/0330374 A1 | 11/2016 | Ilic et al. | |
| 2017/0163882 A1* | 6/2017 | Piramuthu | G06Q 30/0643 |
| 2019/0122384 A1 | 4/2019 | Ertle et al. | |
| 2019/0174056 A1 | 6/2019 | Jung et al. | |
| 2019/0311301 A1* | 10/2019 | Pyati | G06F 16/901 |
| 2020/0286151 A1 | 9/2020 | Jain et al. | |
| 2020/0314332 A1* | 10/2020 | Senzaki | H04N 23/617 |
| 2021/0125251 A1 | 4/2021 | D'Souza et al. | |

FOREIGN PATENT DOCUMENTS

| | | |
|---|---|---|
| CN | 106462766 A | 2/2017 |
| EP | 3261330 A1 | 12/2017 |

OTHER PUBLICATIONS

Sankaran, Anush, et al. "On smartphone camera based fingerphoto authentication." 2015 IEEE 7th international conference on biometrics theory, applications and systems (BTAS). IEEE, 2015. (Year: 2015).*

Bourke, Steven, Kevin Mccarthy, and Barry Smyth. "The social camera: a case-study in contextual image recommendation." Proceedings of the 16th international conference on Intelligent user interfaces. 2011. (Year: 2011).*

Szeliski, Richard, Chapter 4: Feature detection and matching, Computer Vision: Algorithms and Applications, Sep. 3, 2010, pp. 205-266.

Extended European Search Report and Search Opinion issued on European Patent Application No. 20188509 dated Aug. 24, 2020, 8 pages.

Goswami, Anjan, Chittar, Naren, and Sung, Chung H. (2011). "A study on the impact of product images on user clicks for online shopping". In Proceedings of the 20th International Conference Companion on World Wide Web (WWW'11). Association for Computing Machinery, New York, NY, USA, 45-46. Published in 2011.

Gill, Ronnie, and Lewsday. "These Tips Improve iPhone Pictures: Tap Main Focal Point on the Camera Screen to Change Exposure." Dayton Daily News, Mar. 17, 2017, p. SA.4. ProQuest. Web. Mar. 9, 2022 (Year published: 2017).

Cavalcanti, Claudio S., et al. "A Survey on Automatic Techniques for Enhancement and Analysis of Digital Photography." Journal of the Brazilian Computer Society 19:3 (2013): 341-59, ProQuest. Web. Mar. 9, 2022 (Year published: 2013).

Rawat, Yogesh Singh and Kankanhalli, Mohan S. "Context-Aware Photography Learning for Smart Mobile Devices". ACM Transactions on Multimedia Computing Communications and Applications, Association for Computing Machinery. vol. 12, No. 1s, Article 19. Published Oct. 2015. 24 pages. DOI: 10.1145/2808199.

* cited by examiner

FIG. 2

| Parameter of a product image for a coffee mug | Lower Limit | Upper Limit | Ideal |
|---|---|---|---|
| Image resolution | 10 Megapixels | 20 Megapixels | 20 Megapixels |
| Average image brightness (as a percentage of maximum brightness) | 45% | 85% | 56% |
| Depth of field | 10 cm | 100 cm | 21 cm |
| Focal point (relative to the front surface of the mug) | -1 cm | 1 cm | 0 cm |
| Size of the mug (as a percentage of pixels occupied by the mug) | 60% | 80% | 68% |
| Tilt of the mug (relative to horizontal) | -3° | +3° | 0° |
| Azimuthal angle of the mug (relative to the location of the handle of the mug) | 85° | 95° | 90° |
| Contrast (ratio of the brightness of the mug to the brightness of the background) | 2:1 or 1:2 | 20:1 or 1:20 | 6:1 or 1:6 |

FIG. 5

METHOD, SYSTEM, AND NON-TRANSITORY COMPUTER READABLE MEDIUM FOR PROVIDING PRODUCT IMAGE RECOMMENDATIONS

CROSS-REFERENCE TO RELATED APPLICATIONS

This application is a continuation of U.S. patent application Ser. No. 16/662,211, entitled "Systems and Methods for Providing Product Image Recommendations", which was filed on Oct. 24, 2019, the contents of which are incorporated herein by reference in their entirety.

FIELD

The present application relates to the generation of images, and in particular embodiments, to the generation of product images for e-commerce.

BACKGROUND

When shopping online, customers often judge the quality of a product based on how it is presented in an online store. In particular, customers may judge the quality of a product based on the visual representation of that product in an image. Therefore, the manner in which a product is displayed in an image can affect sales.

Professional product photographers often use a particular set of parameters and conditions when photographing a product, which helps ensure that the product will appeal to customers. However, many merchants on e-commerce platforms do not have access to a professional product photographer, and instead choose to photograph their products themselves. These merchants might not know the appropriate parameters and conditions to use when photographing their products, and sales of their products may suffer as a result. In some cases, merchants may rely on a lengthy trial and error process to determine which product images appeal to their customers.

SUMMARY

In some embodiments, a computer-implemented system is disclosed that aims to provide a user with rapid feedback during product photography, or any other process of generating a product image, to improve the quality of the user's product images.

In some embodiments of the present disclosure, a computer-implemented system obtains and analyses product images that are generated by a user, and actively provides the user with recommendations to improve product image quality. The computer-implemented system includes memory that stores a product image model. This product image model relates measurable parameters of a product image to the expected market success of the product image. The computer-implemented system also includes a processor to obtain a product image from a user device, and determine the quality of the product image using the aforementioned product image model. In the case that the product image is not determined to be high-quality, the processor generates at least one recommendation for improving the quality of the product image. Recommendations for improving the quality of the image could include instructions or advice such as: "use a lighter background", "move the camera closer to the product", "rotate the product counter-clockwise by 20°", and "use a brighter light source", for example. The computer-implemented system could also instruct the user device to automatically adjust certain camera settings. The computer-implemented system further includes a software application that instructs a user interface of a user device to display the recommendation to the user. In some implementations, the recommendation is overlaid or superimposed on the product image.

According to an aspect of the present disclosure, a computer-implemented method is provided. The method includes storing, in memory, a model to relate parameters of a product image to market success of the product image. The method also includes obtaining a particular product image, the particular product image having been generated by a user device, and determining particular parameters of the particular product image. The method further includes generating, using the model and the particular parameters, a recommendation for modifying the particular product image, and instructing the user device to display the recommendation on the user device.

In some embodiments, the model includes a look-up table including desired parameters, and generating the recommendation includes comparing the particular parameters to the desired parameters.

In some embodiments, the model is implemented using a machine learning algorithm, and generating the recommendation includes inputting the particular parameters into the machine learning algorithm. Generating the recommendation also includes calculating, using the machine learning algorithm, a prediction of market success of the particular product image, where the recommendation is associated with an improvement to the prediction of the market success of the particular product image. Optionally, the machine learning algorithm includes a neural network, and generating the recommendation further includes determining a modification to the neural network that produces the improvement to the prediction of the market success of the particular product image. Generating the recommendation is based on the modification to the neural network.

In some embodiments, obtaining the particular product image includes receiving the particular product image from the user device.

In some embodiments, instructing the user device to display the recommendation includes transmitting the recommendation to the user device.

In some embodiments, determining the particular parameters of the particular product image includes performing image analysis on the particular product image.

In some embodiments, the method further includes obtaining a description of a product displayed in the particular product image, where determining the particular parameters of the particular product image includes determining a parameter of the particular product image based on the description of the product.

In some embodiments, the method further includes obtaining data indicating a capability of the user device, where determining the particular parameters of the particular product image includes determining a parameter of the particular product image based on the capability of the user device.

In some embodiments, generating the recommendation includes generating the recommendation to improve market success of the particular product image.

In some embodiments, generating the recommendation includes generating an instruction for a user of the user device.

In some embodiments, the method further includes instructing, based on the recommendation, the user device to adjust a setting on the user device.

In some embodiments, instructing the user device to display the recommendation includes instructing the user device to display the recommendation while the particular product image is displayed on the user device.

In some embodiments, the particular product image is a first product image, and instructing the user device to display the recommendation includes instructing the user device to display the recommendation while a second product image is displayed on the user device, the second product image having been captured by the user device.

In some embodiments, the particular product image is a first product image and the particular parameters are a first plurality of parameters. Moreover, the method further includes obtaining a second product image for a same product or object as the first product image, the second product image having been captured by the user device. The method then includes determining a second plurality of parameters of the second product image; determining, using the model and the second plurality of parameters, that the second product image is suitable; and instructing the user device to display, on the user device, an indication that the second product image is suitable.

According to another aspect of the present disclosure, there is provided a system including a memory to store a model relating parameters of a product image to market success of the product image. The system also includes a processor to: obtain a particular product image, the particular product image having been generated by a user device; determine particular parameters of the particular product image; generate, using the model and the particular parameters, a recommendation for modifying the particular product image; and instruct the user device to display the recommendation on the user device.

In some embodiments, the model includes a look-up table including desired parameters, and the recommendation is based on a comparison of the particular parameters and the desired parameters.

In some embodiments, the model is implemented using a machine learning algorithm. The processor is further to input the particular parameters into the machine learning algorithm, and calculate, using the machine learning algorithm, a prediction of market success of the particular product image, where the recommendation is associated with an improvement to the prediction of the market success of the particular product image. Optionally, the machine learning algorithm includes a neural network, and the processor is further to determine a modification to the neural network that produces the improvement to the prediction of the market success of the particular product image, and generate the recommendation based on the modification to the neural network.

In some embodiments, the processor is further to receive the particular product image from the user device.

In some embodiments, the processor is further to transmit the recommendation to the user device.

In some embodiments, the processor is further to perform image analysis on the particular product image to determine the particular parameters.

In some embodiments, the processor is further to obtain a description of a product displayed in the particular product image, and determine a parameter of the particular product image based on the description of the product.

In some embodiments, the processor is further to obtain data indicating a capability of the user device, and determine a parameter of the particular product image based on the capability of the user device.

In some embodiments, the recommendation is to improve market success of the particular product image.

In some embodiments, the recommendation includes an instruction for a user of the user device.

In some embodiments, the processor is further to instruct, based on the recommendation, the user device to adjust a setting on the user device.

In some embodiments, the processor is further to instruct the user device to display the recommendation while the particular product image is displayed on the user device.

In some embodiments, the particular product image is a first product image, and the processor is further to instruct the user device to display the recommendation while a second product image is displayed on the user device, the second product image having been captured by the user device.

In some embodiments, the particular product image is a first product image and the particular parameters are a first plurality of parameters. The processor is further to obtain a second product image for a same product as the first product image, the second product image having been captured by the user device. Furthermore, the processor is to: determine a second plurality of parameters of the second product image; determine, using the model and the second plurality of parameters, that the second product image is suitable; and instruct the user device to display, on the user device, an indication that the second product image is suitable.

BRIEF DESCRIPTION OF THE DRAWINGS

Embodiments will be described, by way of example only, with reference to the accompanying figures wherein:

FIG. 2 is an example of a home page of an administrator, according to one embodiment;

FIG. 5 is a diagram illustrating an example product image model in the form of a look-up table;

DETAILED DESCRIPTION

For illustrative purposes, specific example embodiments will now be explained in greater detail below in conjunction with the figures.

Example e-Commerce Platform

In some embodiments, the methods disclosed herein may be performed on or in association with an e-commerce platform. Therefore, an example of an e-commerce platform will be described.

Figure 1:
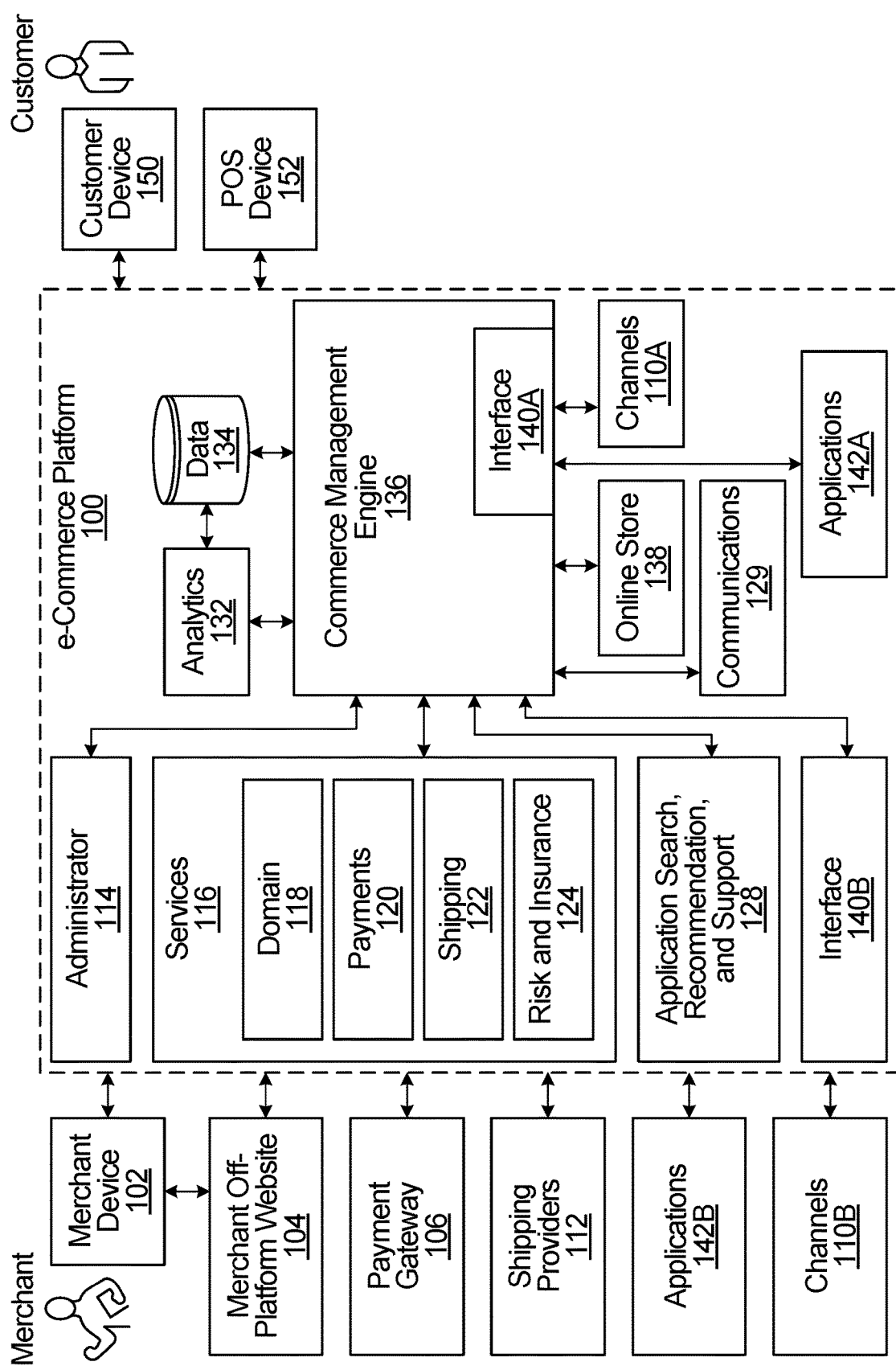
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
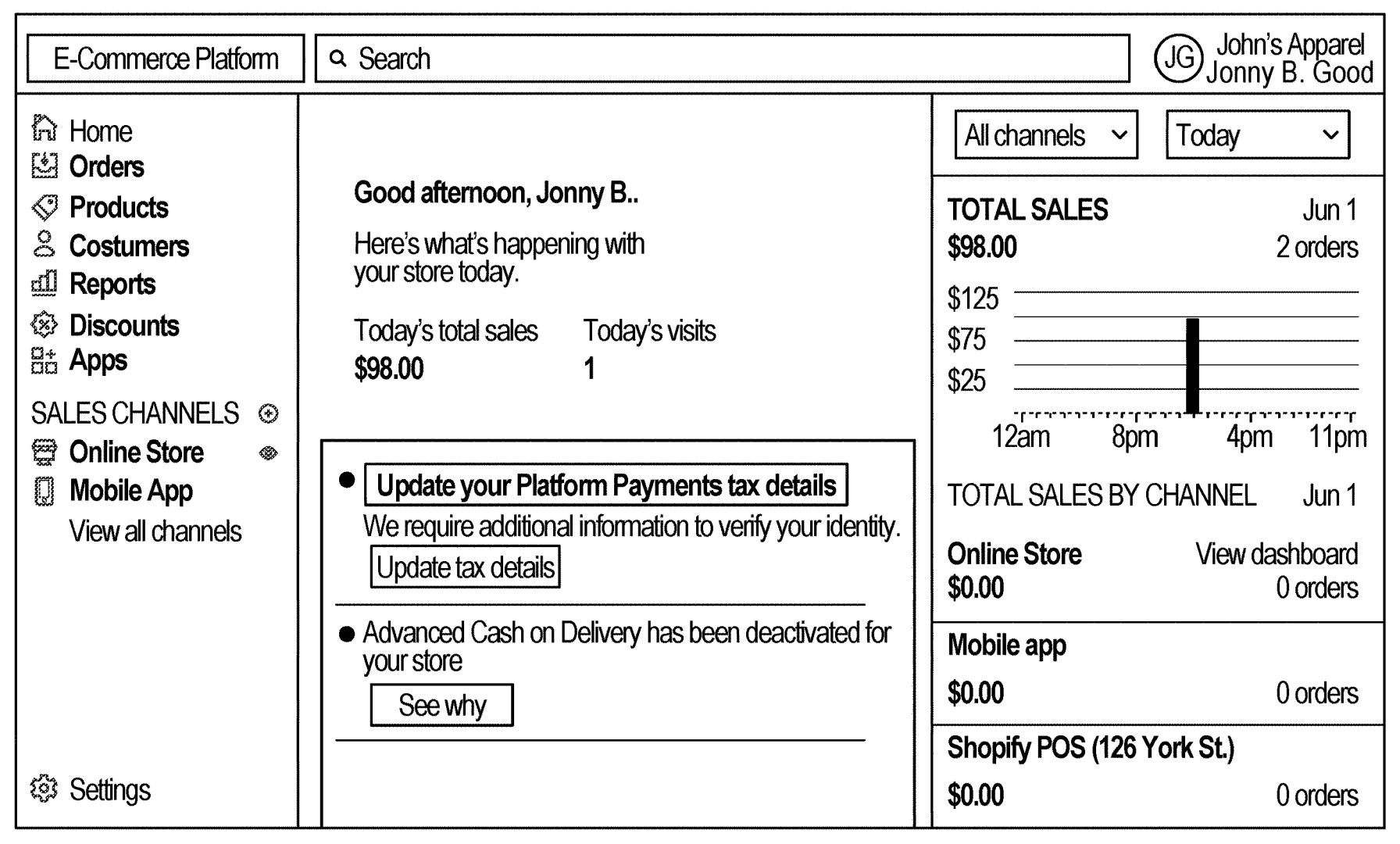

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation of Product Image Recommendations Using an e-Commerce Platform

Figure 3:
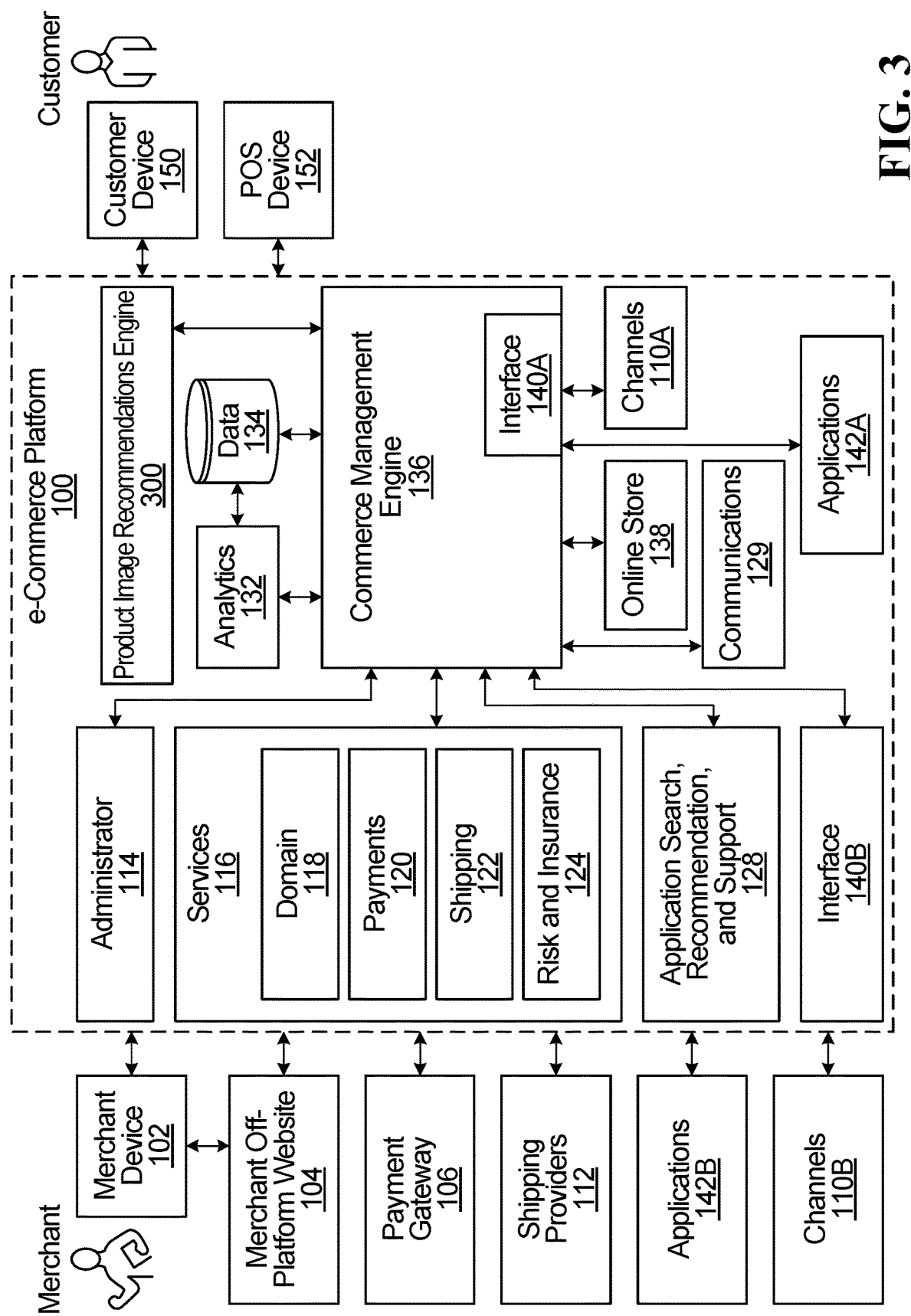
FIG. 3 illustrates the e-commerce platform of FIG. 1, but including a product image recommendations engine.

The e-commerce platform 100 could help or assist a merchant that is in the process of generating images of their products. FIG. 3 illustrates the e-commerce platform 100 of FIG. 1, but including a product image recommendations engine 300. The product image recommendations engine 300 is an example of a computer-implemented system that obtains and analyses product images generated by a user, and actively provides the user with recommendations to improve product image quality. In an example, the user is a merchant that is photographing their product for presentation in the online store 138. During the process of photographing their product, the merchant device 102 sends a preliminary product image to the product image recommendations engine 300. The product image recommendations engine 300 then analyses the product image and provides the merchant with a recommendation for improving the quality of subsequent product images.

Although the product image recommendations engine 300 is illustrated as a distinct component of the e-commerce platform 100 in FIG. 3, this is only an example. A product image recommendations engine could also or instead be provided by another component of the e-commerce platform 100. In some embodiments, either or both of the applications 142A-B provide a product image recommendations engine that is available to merchants. Furthermore, in some embodiments, the commerce management engine 136 provides a product image recommendations engine. The e-commerce platform 100 could include multiple product image recommendations engines that are provided by one or more parties. The multiple product image recommendation engines could be implemented in the same way, in similar ways, and/or in distinct ways. In addition, at least a portion of a product image recommendations engine could be implemented on the merchant device 102. For example, the merchant device 102 could store and run the product image recommendations engine locally as a software application.

As discussed in further detail below, the product image recommendations engine 300 could implement at least some of the functionality described herein. Although the embodiments described below may be implemented in association with the e-commerce platform 100, the embodiments described below are not limited to the specific e-commerce platform 100 of FIGS. 1 to 3. Therefore, the embodiments below will be presented more generally in relation to any e-commerce platform.

Product Images

As used herein, the term "product image" refers to any image that illustrates or depicts a product. In particular embodiments, a product image is used to present or display a product that is offered for sale in an online store. Product images could also or instead be used in other forms of media, such as in advertisements or articles, for example.

The manner by which a product image is generated is not limited herein. A product image may be generated, at least in part, by capturing an image of a physical product or object using a camera or scanner, for example. Product images that are generated, at least in part, using computer-generated imagery (CGI) are also contemplated. A product image could be two-dimensional (2D) or three-dimensional (3D).

In some embodiments, a product image is animated. For example, a product image could include a video of a product. A 3D scan of a product could be converted to an animated product image that illustrates the product from various angles.

As noted above, customers often judge the quality of a product based on how it is presented in a product image. This may be particularly relevant for online shopping, as a customer typically does not have the option of inspecting the physical product, and therefore the customer may judge the product based on its associated product image. In some cases, the customer can be influenced by the quality of the product image.

As used herein, the "quality" of a product image relates to the perceived value of a product that is conveyed by a product image. The factors affecting the quality of a product image are not limited to the properties of the device that was used to generate the product image. By way of example, the properties of a camera that is used to photograph a product and the conditions that the product is photographed under can both affect the quality of a resulting product image. A high-quality product image is one that portrays the product in a way that is appealing to customers, and is typically associated with higher market success. In contrast, a low-quality product image is an image that portrays the product in a way that is unclear, ambiguous or otherwise unappealing to customers. Low-quality product images may lead to lower market success, especially when these low-quality product images are displayed to a customer alongside high-quality product images for similar products in an online store, for example. Accordingly, many merchants desire high-quality product images for their products.

Market success relates to how well something is received in a commercial market. In some cases, the market success of a product image is measured, at least in part, in terms of the market success of the product that is displayed in the product image. However, in general, the market success of a product image could be measured or quantified in any of a variety of ways. The following is a non-limiting list of measurable metrics or parameters that are indicative of the market success of a product image:

- sales data, such as quantity and/or dollar amount of sales of the product;
- quantity of sales of the product relative to the total number of sales for similar products;
- pages views, including the number of customers that viewed the product or product image (for example, the click-through rate of a website link associated with a product image);
- customers that enlarged the product image;
- average time customers spent viewing the product image;
- whether or not the product image was taken by a professional product photographer;
- social media re-sharing of a product image or of a product associated with a product image; and
- consistency or similarity with other product images sold by the same merchant (for example, a product image having consistent or similar parameter values with other product images sold by the same merchant, further details of which are provided below).

Any one or any combination of these parameters determined to meet or exceed a desired target value or values may be indicative of high-market success. On the other hand, any one or any combination of these parameters determined to fall below a desired target value or values may be indicative of low-market success. In other words, improving the market success of a product image (as indicated or measured via any one of the parameters above) could lead, directly or indirectly, to increased sales of a product. Therefore, some embodiments provided herein relate to the generation of a recommendation to improve the market success of a product image.

Implementation of Product Image Recommendations

Figure 4:
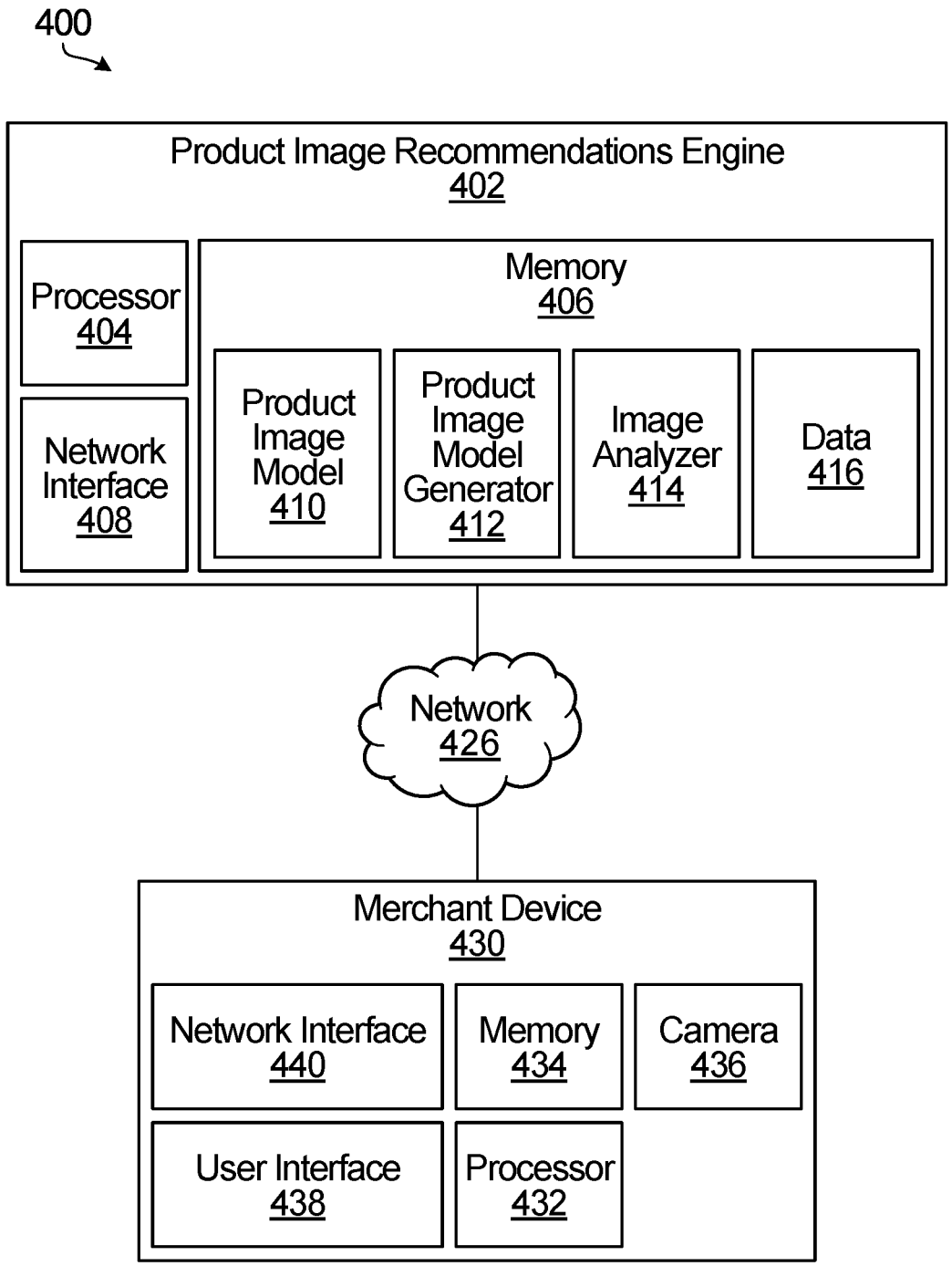
FIG. 4 is a block diagram illustrating an example system for implementing product image recommendations.

FIG. 4 is a block diagram illustrating an example system 400 for implementing product image recommendations. The system 400 includes a product image recommendations engine 402, a network 426, and a merchant device 430.

The product image recommendations engine 402 includes a processor 404, memory 406, and a network interface 408. The processor 404 may be implemented by one or more processors that execute instructions stored in the memory 406. Alternatively, some or all of the processor 404 may be implemented using dedicated circuitry, such as an application specific integrated circuit (ASIC), a graphics processing unit (GPU), or a programmed field programmable gate array (FPGA).

The memory 406 stores a product image model 410 to relate parameters of a product image to market success of the product image (as indicated or measured via indicators of market success such as those described above). Stated differently, the product image model 410 characterizes the relationship or correlation between measurable parameters of a product image and predicted or measured market success of the product image. Parameters of a product image could include any metric that relates, directly or indirectly, to the quality or market success of the product image. Non-limiting examples of such parameters include:

- image resolution;
- pixel density of the image;
- image brightness;
- depth of field;
- focus;
- size of the product in the image (in terms of percentage of area occupied by the product and/or number of pixels occupied by the product, for example);
- angle or orientation of the product in the image; and
- contrast between the product and the background.

The relationship between parameters of a product image and market success of the product image could vary based on the type of product being imaged. For example, the manner in which a chair is photographed to produce a high-quality product image might differ from how clothing is photographed to produce a high-quality product image. Therefore, the product image model 410 can be dependent on product type. Alternatively, the product image model 410 could actually be multiple different product image models, where each product image model is for a different type of product.

The relationship between parameters of a product image and market success of the product image could also or instead vary for customers living in different countries or regions. For example, a product image that achieves high-market success in Canada might not achieve high-market success in China. As such, the product image model 410 could be dependent on the country or region where the product is being sold, or the product image model 410 could be multiple different product image models, where each product image model is for a different country or region.

In some implementations, the product image model 410 is specific to, or dependent on, a particular merchant and/or a particular online store. For example, if a merchant operates an online store that sells multiple different coffee mugs, a product image model that is specific to that merchant and to coffee mugs could be generated. This could help provide consistency in the product images that are used by this particular merchant.

The product image model 410 could be implemented in any of a variety of ways. Example implementations of product image models include a look-up table and a machine learning algorithm. However, other implementations of product image models are also contemplated.

In the look-up table implementation, a table could store a list of different product image parameters, and a value and/or a range of values for each product image parameter that is/are expected to produce a high-quality product image or be associated with high-market success. These values or range of values may be determined based on the values of product image parameters of product images known to be associated with high-market success (e.g. any one or a combination of the market success metrics determined to be meet or exceed desired values as noted above). The product image parameters stored in a look-up table could be referred to as desired parameters. Different look-up tables can be used for different product types, different merchants and/or different regions.

FIG. 5 is a diagram illustrating an example product image model in the form of a look-up table 500. The look-up table 500 is specific to product images for coffee mugs, and defines a lower limit, upper limit, and ideal value for multiple parameters of a product image. The look-up table 500 could also be specific to a particular region and/or a particular merchant. The multiple parameters defined in the look-up table 500, which are discussed in further detail below, include image resolution, average image brightness, depth of field, focal point, size of the mug, tilt of the mug, azimuthal angle of the mug, and contrast.

Image resolution relates to the number of pixels in an image and is measured in megapixels in the look-up table 500. The lower limit for image resolution is 10 megapixels, as an image resolution that is lower than 10 megapixels could result in a noticeably blurry image in some cases. The upper limit for image resolution is 20 megapixels, as this is the maximum image resolution that is permitted by an e-commerce platform in this example. Other e-commerce platforms could have other maximum values for image resolution. The ideal value of image resolution is also 20 megapixels, as customers might prefer high resolution images for the level of detail and sharp lines they provide. However, in other embodiments, the lower limit, upper limit and ideal values for image resolution could differ from those shown in the look-up table 500. For example, in regions of the world with relatively slow internet speeds, image resolutions larger than 10 megapixels might not be desirable, as these images might load slowly on a customer device. Therefore, a look-up table for coffee mugs in these regions of the world may have smaller values for image resolution.

Average image brightness relates to the overall lightness or darkness of an image. In the look-up table 500, average image brightness is defined as a percentage of maximum image brightness. Maximum image brightness (100%) is when each pixel is set to its brightness value, producing a completely white image. Therefore, an average image brightness of 0% is a completely black image. Image brightness could be defined differently in other embodiments. There is a relatively wide range between the lower limit and upper limit for average image brightness in the look-up table 500, which indicates that a wide range of brightness' could be suitable for a coffee mug product image.

In the look-up table 500, depth of field relates to how much of the coffee mug is in focus in a product image. The lower limit for depth of field being 10 cm could help ensure that the entire coffee mug is in focus.

The focal point is measured relative to the front surface of the coffee mug in the look-up table 500. The front surface of the coffee mug might be where any illustrations are shown, and the focus is ideally at this surface of the coffee mug to show these illustrations more clearly. Therefore, the ideal value for focal point in the look-up table 500 is 0 cm. A relatively narrow range of +1-1 cm is defined for the upper and lower limits for focal point.

As defined in the look-up table 500, the size of the mug relates to the size of the coffee mug in the product image. This is measured in terms of the percentage of pixels in the product image that are occupied by the coffee mug. An image that fills the entirety of a product image would be considered to occupy 100% of the pixels in the product image.

The tilt of the mug in the look-up table 500 defines the angle of the coffee mug in the product image with respect to horizontal. The ideal value for tilt is 0°, which represents a coffee mug that appears to rest on a flat surface in the product image. A tilt value that differs from 0° could result from a coffee mug being on a sloped surface, or from a camera being tilted relative to horizontal.

The azimuthal angle of the mug defines the portion or side of the coffee mug that is in view in the product image. The azimuthal angle is defined relative to the handle of the coffee mug in the look-up table 500. A product image for a coffee mug with an azimuthal angle of 0° would have the handle pointed towards the camera. The ideal value for azimuthal angle in the look-up table 500 is 90°, which corresponds to the handle of the coffee mug being viewed from the side in the product image. This could allow a customer to appreciate the shape of the handle.

Contrast relates to how well the coffee mug stands out from the background of the product image. In the look-up table 500, the contrast is defined as the ratio of the average brightness of the coffee mug to the average brightness of the background. This contrast could be greater than one or less than one. For example, a dark coffee mug and a light background would produce a contrast that is less than one, whereas a light coffee mug and a dark background would produce a contrast that is greater than one. Therefore, the upper limit, lower limit and ideal value for contrast are expressed as being either greater than one (e.g., 2:1) or less than one (e.g., 1:2) in the look-up table 500.

It should be noted that the specific parameters and values shown in the look-up table 500 are provided by way of example only. This example is in no way limiting. Other look-up tables, whether for coffee mugs or another type of product, could include a different number of parameters, different types of parameters, different metrics for characterising parameters, and different lower limits, upper limits and ideal values for the parameters. Other formats of look-up tables, different from that shown in FIG. 5, are also contemplated.

The look-up table 500 could be used by the product image recommendations engine 402 to predict the market success of a product image for a coffee mug. For example, if any parameter of a product image for a coffee mug is not within the lower and upper limits defined in the look-up table 500, then that parameter could be considered to degrade the quality of the product image and/or be associated with low-market success. Alternatively, if any parameter of a product image for a coffee mug differs from the ideal value in the look-up table 500 by more than a predetermined threshold, then that parameter could be considered to degrade the quality of the product image and/or be associated with low-market success.

In the machine learning implementation of a product image model, a machine learning algorithm could be trained to predict the market success of a product image based on the parameters of the product image. The machine learning algorithm could also trained to predict that a product image will be associated with market success by tracking parameters of product images known to be associated with high-market success (e.g. as measured via any one or a combination of the market success metrics determined to be meet or exceed desired values as noted above). In some embodiments, the machine learning algorithm is or includes a neural network. Inputs to the neural network could include one or more parameters of a product image, and outputs of the neural network could include an indication of the predicted market success for the product image. Predicted market success for a product image relates to the level of market success that the product image is expected to achieve in a real commercial market. In some cases, a neural network could predict the sales of a product based on parameters of an associated product image. Different neural networks can be trained for different product types, merchants, and/or customer regions. Alternatively, a neural network could include an input for product type, an input for a merchant identifier, and/or an input for customer region, and could calculate the predicted market success of a product image based on the product type, merchant and/or customer region.

Figure 6:
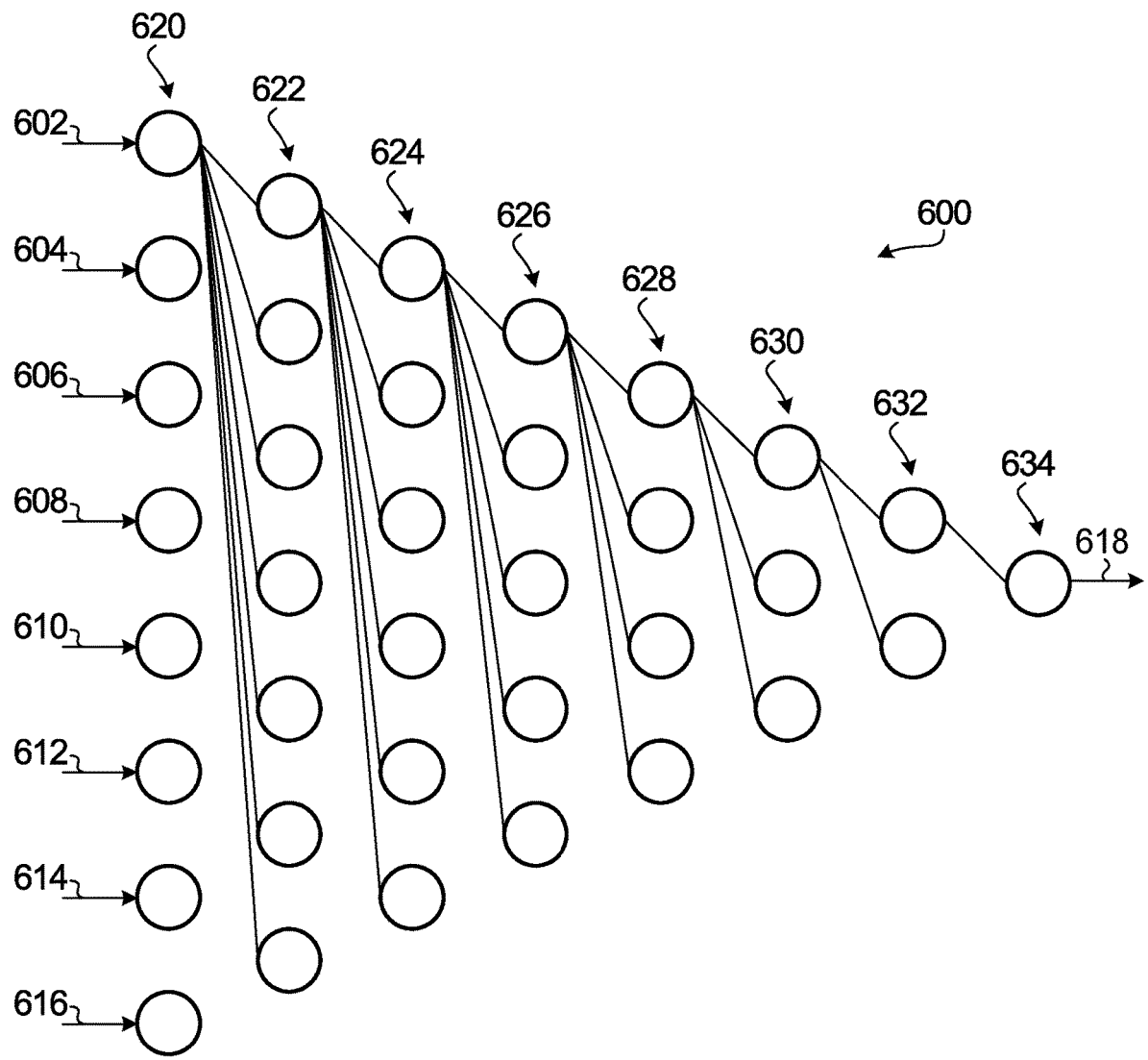
FIG. 6 is a diagram illustrating an example product image model in the form of a neural network.

FIG. 6 is a diagram illustrating an example product image model in the form of a neural network 600. The neural network 600 is illustrated as being triangular or pyramidal in shape, and includes multiple inputs 602, 604, 606, 608, 610, 612, 614, 616, an output 618 and multiple layers 620, 622, 624, 626, 628, 630, 632, 634 of nodes. The inputs 602, 604, 606, 608, 610, 612, 614, 616 are fed into respective nodes in the layer 620, and therefore the layer 620 could be considered an input layer. The output 618 is produced by a node in the layer 634, and therefore the layer 634 could be considered an output layer. The layers 622, 624, 626, 628, 630, 632 could be considered hidden layers. It should be noted that the neural network 600 is only an example, and should not be considered limiting in any way. The number of inputs, number of outputs, number of layers, and structure of a neural network is not limited herein.

At least some of the inputs 602, 604, 606, 608, 610, 612, 614, 616 correspond to parameters of a product image. One or more of the inputs 602, 604, 606, 608, 610, 612, 614, 616 could also relate to the type of product in the product image, a merchant identifier and/or to the region where the product is being sold. Alternatively, the neural network 600 could be specific to a type of product, a merchant and/or a region. By way of example, the neural network 600 could be specific to coffee mugs being sold in a particular region, and the inputs 602, 604, 606, 608, 610, 612, 614, 616 could correspond respectively to the image resolution, average image brightness, depth of field, focal point, size of the mug, tilt of the mug, azimuthal angle of the mug and contrast defined in the look-up table 500 of FIG. 5.

The output 618 corresponds to an indication of the predicted market success for the product image. An indication of market success for a product image could include any measure of how appealing the product image is to customers. In some implementations, an indication of market success is based on one or more metrics indicative of the level of market success of a product image. Examples of these metrics are provided above.

In some implementations, the output 618 is selected from a set of discrete indications of predicted market success for a product image. By way of example, a set of discrete indications of predicted market success for a product image could include any or all of the following indications:

product image is predicted to have high-market success;
product image is predicted to have moderate-market success; and
product image is predicted to have low-market success.

In some implementations, the output 618 quantifies the predicted market success for a product image. For example, the output 618 could quantify how well a product image compares to other product images in terms of market success. This could be expressed in terms of a percentage. If the neural network 600 determines that a product image is expected to have a higher market success than 68% of product images for that product type, then the output 618 could be "68".

The nodes of the neural network 600 map the inputs 602, 604, 606, 608, 610, 612, 614, 616 to the output 618. The nodes in the layer 620 receive the inputs 602, 604, 606, 608, 610, 612, 614, 616, process the inputs, and send a signal to each node in the layer 622. Each node in the layer 622 receives a signal from each node in the layer 620, processes the signals, and outputs a signal to each node in the layer 624. This process continues until reaching the final layer 634. To avoid congestion in FIG. 6, only the first node in each of the layers 620, 622, 624, 626, 628, 630 is shown with a line connecting to the nodes of a subsequent layer. In practice, each node in the layers 620, 622, 624, 626, 628, 630, 632 sends a signal to each node of the subsequent layer.

The nodes in the layers 620, 622, 624, 626, 628, 630, 632, 634 could be implemented in any way known in the art. In some implementations, the nodes include activation functions, but this is only an example. To generate accurate predictions of market success for a product image, the nodes of the neural network 600 need to be trained using an appropriate data set. This training is discussed in further detail below.

Once trained, the neural network 600 could recognise patterns between parameters of product images and market success of product images (via market success metrics). As such, the product image recommendations engine 402 could use the neural network 600 to predict the market success of a product image. As discussed in further detail elsewhere herein, a neural network could also be used to determine how a product image could be modified to improve predicted market success.

Neural networks are one example of a machine learning algorithm that can be used in a product image model. Other machine learning algorithms, including decision trees, support vector machines, Bayesian networks and generic algorithms, are also contemplated.

Referring again to FIG. 4, the memory 406 also stores a product image model generator 412, which facilitates the generation of the product image model 410. Once the product image model 410 is generated, it may be periodically updated when market trends change and/or when new data becomes available, for example. This updating can also be facilitated by the product image model generator 412.

In some implementations, the product image model generator 412 provides a software application that is executable by the processor 404 and allows a user to manually generate and/or update at least a portion the product image model 410. For example, the product image model generator 412 could generate a look-up table and allow a user to manually enter parameters and/or values into the look-up table. These parameters and values may be ones that are commonly used by professional product photographers, and are therefore expected to produce high-quality product images and/or product images with high-market success. The parameters and values may also or instead be ones that are commonly used by a particular merchant, and therefore the look-up table would be specific to the particular merchant and could help provide consistency in the merchant's product images.

In the case that the product image model 410 is or includes a machine learning algorithm, the product image model generator 412 includes a training algorithm to train the machine learning algorithm. This training algorithm could involve supervised learning, unsupervised learning, or reinforcement learning, for example. The training algorithm could be stored as instructions that are executed by the processor 404.

The memory 406 stores data 416 that is used by the product image model generator 412 for training the machine learning algorithm. The data 416 is acquired from existing product images in an e-commerce platform. These existing product images could include product images that are and/or have been used to display a product for sale on an online store. In some implementations, the data 416 could be provided by a data facility of an e-commerce platform, such as the data facility 134 of FIG. 1, for example. The data 416 could form part of a larger data set that stores other information related to e-commerce. Alternatively, the data 416 could be a data set that is specific to product image recommendations. The product image recommendations engine 402 could continuously or periodically acquire and store new information in the data 416. Older information could also be removed from the data 416 as new information become available.

For a particular existing product image, the data 416 could store any or all of the following information:
- product type;
- merchant that the product image belongs to;
- parameters of the product image;
- metrics indicative of market success of the product image; and
- an indication of market success of the product image.

This list of information is not intended to be limiting. Some of the information in the data 416 could be region-dependent. For example, metrics of market success for a product image could be stored for each region where the product is being sold. This could allow for the generation of region-specific and region-dependent machine learning algorithms.

Some of the information in the data 416 could be tracked over time. This could allow for the product image recommendation engine 402 to track the market success of product images over time. For example, the product image recommendations engine 402 may be able to determine if certain parameters of product images are becoming more or less important for determining market success, and if the ideal values for certain parameters are changing. The product image model generator 412 could train a machine learning algorithm using the most recent information in the data 416. In some implementations, a machine learning algorithm could be trained to predict product images that will have high-market success in the future based on trends in the data 416.

In some implementations, only data that is associated with a particular merchant or particular merchants (or their respective online stores) is used to train a machine learning algorithm. This results in the generation of a machine learning algorithm that is specific to the merchant or merchants. The machine learning algorithm could then help provide recommendations to maintain consistency in the product images used by the merchant or merchants.

In some cases, the data 416 is divided into a training data set and a test data set. The product image model generator 412 uses the training data to train the machine learning algorithm that implements the product image model 410. The test data set is used to test the accuracy of the machine learning algorithm after training.

The memory 406 further includes an image analyzer 414. The image analyzer 414 receives a product image and determines parameters of the product image. In some cases, the image analyzer 414 is used to determine the parameters of existing product images for storage in the data 416. The image analyzer 414 could also or instead be used to determine the product image parameters for a product image that is received from a merchant, which are then input into the product image model 410.

In some implementations, the image analyzer 414 is or includes an image analysis algorithm that is executed by the processor 404. An image analysis algorithm may include an image segmentation process to locate the boundary between the product and the background in a product image. This may help when determining certain parameters of the product image, such as the percentage of a product image that is occupied by a product, for example.

An example of an image analysis algorithm is the scale-invariant feature transform (SIFT). The SIFT algorithm extracts points of interest, termed keypoints in the SIFT framework, from a target image. The extracted keypoints carry their own information of location, scale and rotation, which helps detect and describe features of the image. The detected features can then be used to generate parameters of the product image. Further detail regarding the SIFT algorithm, and several other example image analysis algorithms, can be found in *Computer Vision: Algorithms and Applications* by Richard Szeliski (Springer, 2010).

The network interface 408 in the product image recommendations engine 402 is provided for communication over the network 426. The structure of the network interface 408 is implementation specific. For example, in some implementations the network interface 408 may include a network interface card (NIC), a computer port (e.g., a physical outlet to which a plug or cable connects), and/or a network socket.

The merchant device 430 is an example of a user device. The merchant device 430 may be a mobile phone, tablet, laptop, or computer owned and/or used by a merchant. The merchant device 430 includes a processor 432, memory 434, camera 436, user interface 438 and network interface 440. An example of a user interface is a display screen (which may be a touch screen), a keyboard, and/or a mouse. The network interface 440 is provided for communicating over the network 426. The structure of the network interface 440 will depend on how the merchant device 430 interfaces with the network 426. For example, if the merchant device 430 is a mobile phone or tablet, the network interface 440 may include a transmitter/receiver with an antenna to send and receive wireless transmissions to/from the network 426. If the merchant device is a personal computer connected to the network with a network cable, the network interface 440 may include, for example, a NIC, a computer port, and/or a network socket. The processor 432 directly performs or instructs all of the operations performed by the merchant device 430. Examples of these operations include processing user inputs received from the user interface 438, preparing information for transmission over the network 426, processing data received over the network 426, and instructing a display screen to display information. The processor 432 may be implemented by one or more processors that execute instructions stored in the memory 434. Alternatively, some or all of the processor 432 may be implemented using dedicated circuitry, such as an ASIC, a GPU, or a programmed FPGA. The camera 436 is provided to take photographs, which can be stored in the memory 434. The camera 436 is one example of a device for generating an image of an object. A merchant device could also or instead include other devices such as scanners, for example. Although the camera 436 is shown as a component of the merchant device 430, the camera could instead be implemented separate from the merchant device and communicate with the merchant device via wired or wireless connections, for example.

In FIG. 4, one merchant device is shown by way of example. In general, more than one merchant device may be in communication with a product image recommendations engine 402.

The product image recommendations engine 402 could be implemented in any of a variety of ways. For example, the product image recommendations engine 402 could be implemented by an e-commerce platform, either as a core function provided by the e-commerce platform, or by an application supported by the e-commerce platform. The product image recommendations engine 402 could also or instead be implemented outside of an e-commerce platform. In some embodiments, a product image recommendations engine is implemented in part or in whole on a user device, such as the merchant device 430. For example, a software application may be installed on a user device that performs image analysis and recommendation generation locally (i.e., on the user device). The software application could download the product image model 410 and/or the image analyzer 414 from a server, which may or may not be part of a product image recommendations engine or e-commerce platform.

The system 400 could provide a user with product image recommendations while the user is in the process of generating a product image. An example process for providing product image recommendations is described below with reference to FIG. 7, which is a flow diagram illustrating a process 700. The process 700 includes multiple steps 702, 704, 706, 708, 710, 712, 714, 716, 718.

Step 702 includes generating and/or updating the product image model 410, and could be performed using the product image model generator 412. One option for generating a product image model is to generate a look-up table by manually populating the look-up table with desired parameters. These desired parameters correspond to product image parameters that are expected to produce high-quality images and/or images associated with high-market success. For example, parameters that are commonly used by professional product photographers could be used to populate the look-up table.

Another option for generating a product image model is to generate and train a machine learning algorithm. Training the neural network is performed using the data 416. Parameters from existing product images are provided as inputs to the neural network during training, and an indication of the market success of the existing product images is used as the known result for training. The training could be performed using any method known in the art.

Since the machine learning algorithm is trained using measured market success for existing product images, the trained machine learning algorithm could offer a product image model that closely reflects the preferences of actual customers. In contrast, a professional product photographer might not have access to data such as the data 416, or have the ability to analyze the data. A professional product photographer might also import a personal bias into their product images that does not reflect the preferences of actual customers. Therefore, at least when compared to a professional product photographer, a trained machine learning algorithm may be better at predicting parameters of a product image that result in high-market success.

Once a machine learning algorithm is trained, the product image model 410 could be implemented using the trained machine learning algorithm. In some implementations, the product image model generator 412 generates a look-up table using a trained machine learning algorithm, and the product image model 410 is also or instead implemented using the look-up table. To generate a look-up table using a machine learning algorithm, the product image model generator 412 could search for product image parameters that are predicted to have high-market success by the machine learning algorithm. This search could include a random search of product image parameters and/or an optimization algorithm. The product image parameters that are found in the search could be referred to as desired product image parameters, and could be used to populate the look-up table.

Step 702 is an optional step. For example, the product image model 410 might be generated only once, and the process 700 could be repeated multiple times without generating a new product image model. Alternatively, the product image model could be received, rather than being generated.

Step 704 includes storing, in memory, the product image model 410. This memory could be the memory 406 of the product image recommendations engine 402, or the memory 434 of the merchant device 430. For example, the merchant device 430 could download the product image model 410 from the product image recommendations engine 402. Alternatively, the merchant device 430 could store the product image model generator 412 in the memory 434, and locally generate the product image model 410. The data 416 could also be stored in the memory 434, or the merchant device 430 could receive at least a portion of the data 416 via the network 426.

Step 706 includes obtaining a product image, the product image having been generated by a user device. In this example, the merchant device 430 will be assumed, but in general the process 700 could relate to any user device. In some implementations, the product image is obtained by capturing a photograph of a product using the camera 436. The product image could be obtained after the merchant actively captures an image. For example, the merchant could press a button on the user interface 438 to instruct the camera 436 to capture an image. The product image could instead be automatically obtained from the camera 436 at predefined intervals. For example, once a second the merchant device 430 could obtain an image of what the camera 436 is currently viewing. This may be the image that is in an electronic viewfinder of the camera 436.

In some implementations, the product image is generated by the merchant device 430 at least in part using CGI. A software application running on the merchant device 430 could allow the merchant to generate the CGI product image, which may or may not also include a photograph. The CGI product image could be obtained after the merchant actively saves the image, or the CGI product image could be obtained automatically while the merchant is in the process of generating the image.

In some cases, the obtained product image might not represent the full capabilities of the device that was used to generate the product image. In one example, an image displayed in an electronic viewfinder might not use the full capabilities of the camera 436, as the image might have a decreased resolution compared to a normally taken picture. In another example, a CGI image that is automatically obtained from a software application might not have been properly rendered to produce a high-resolution image. Therefore, step 706 could further include obtaining data indicating one or more capabilities of the merchant device 430 and/or the camera 436. This data, which could also be considered metadata, could include the true resolution of the camera 436 or the expected resolution of a CGI image after rendering, for example.

Photography and CGI are example methods for generating a product image, but others are also contemplated. For example, a product image could be generated using a 2D or 3D scanner. The manner by which a product image is generated is not limited in the process 700.

In some implementations, step 706 further includes obtaining a description of the product displayed in the product image. This description can be used to aid in the analysis of the product image. In some cases, the description could be generated by the merchant answering a series of questions regarding the product via the user interface 438, for example. This series of questions could be designed to generate information that is relevant to generating a product image recommendation. Non-limiting examples of information that is relevant to generating a product image recommendation include the type of product, the size of the product, and the color of the product. Alternatively, the description of the product could be a general description that is intended to describe the product to customers in an online store, for example. A text analysis algorithm may be used to mine the general description and return information that is relevant to generating a product image recommendation.

In some implementations, obtaining the product image at step 706 includes the product image recommendations engine 402 receiving the product image, a capability of the merchant device 430 and/or a description of the product displayed in the product image from the merchant device. For example, the product image could be transmitted over the network 426 to the product image recommendations engine 402. However, in implementations where the merchant device 430 stores the product image model 410 and/or the image analyzer 414, transmitting the product image might not occur.

Referring now to step 708, this step includes determining parameters of the particular product image. This step is performed using the image analyzer 414. In some implementations, step 708 includes performing image analysis on the particular product image.

In the case that a description of the product displayed in the product image is obtained in step 706, then at least one parameter of the product image can be determined based on the description of the product. For example, the description of the product could indicate that a product is a white coffee mug, and an image analysis algorithm could use this information as an input to help differentiate the product (i.e., the coffee mug) from the background of a product image.

In the case that data indicating a capability of the merchant device 430 and/or the camera 436 is obtained in step 706, then the at least one parameter of the product image can be determined based on this capability. For example, if this data indicates that a true resolution of the camera 436 is 20 megapixels, but the obtained product image only has a resolution of 5 megapixels, then the product image will be considered to have a resolution of 20 megapixels.

Step 708 could be performed by the product image recommendations engine 402 or by the merchant device 430. In implementations where the product image was transmitted to the product image recommendations engine, then the processor 404, using image analyzer 414, could generate the parameters of the product image. In some implementations, the memory 434 on the merchant device 430 stores the image analyzer 414, and the processor 432 could generate the parameters of the product image locally. The image analyzer 414 could have been transmitted to the merchant device 430 via the network 426, for example. Optionally, parameters of the product image could be transmitted from the merchant device 430 to the product image recommendations engine 402.

Step 710 includes generating a recommendation for modifying the product image. This step is performed using the product image model 410 and the parameters of the product image determined at step 708. The parameters of the product image are input into the product image model 410 to produce an estimate of the quality of the product image and/or a prediction of market success of the product image. In some cases, the product image model 410 might predict that the product image will have relatively low-market success. The product image model 410 is then used to generate the recommendation for modifying the product image. The recommendation could instruct the merchant and/or the merchant device 430 to produce another product image having one or more parameters that differ from the initial product image. The different parameters could improve the quality of the subsequent product image.

In some implementations, the recommendation is generated to improve the predicted market success of the product image and/or the consistency of the product image with other product images used by the merchant.

In cases where the product image is or includes a photograph, the recommendation to modify the product image may include: a recommendation to change the camera model that is used to take the product image, a recommendation to change the settings of the camera, and/or a recommendation to change the conditions in which the product image is taken. The parameters of a product image are dependent on the capabilities of the camera model that is used to take the product image, the settings of the camera, and the conditions in which the product image is taken, and therefore changing any of these capabilities, settings and conditions will modify the parameters of a product image. The following is a non-limiting list of capabilities, settings and conditions that may be changed to modify a product image:

camera resolution;
camera sensitivity (for example, ISO or charge-coupled device (CCD) gain);
aperture size;
exposure time;
zoom settings (digital and optical);
filtering (digital and optical);
flash settings;
distance from the camera to the product;
orientation of the product relative to the camera;
light source(s) used; and
background(s) used.

An aim of step 710 is to generate a recommendation to help a merchant generate a subsequent product image with one or more parameters that differ from an initial product image, and that improve the quality of the subsequent product image compared to the initial product image. In some implementations, the recommendation includes an instruction for the merchant. For example, the instruction may be to change a camera model, light source, background, distance from the camera to the product and/or orientation of the product relative to the camera. In some implementations, the recommendation includes an instruction that is automatically performed by the merchant device 430. For example, the instruction may be to change a sensitivity, aperture size, exposure time, zoom setting, filtering and/or flash setting on the camera 436. In that example, the recommendation may be in the form of a user notification and the instruction may be performed automatically without user intervention.

The generation of a recommendation in step 710 can be performed in any of a variety of different ways depending on the type of product image model used.

For a product image model that is implemented in the form of a look-up table, generating the recommendation in step 710 includes comparing the parameters of the product image to the desired parameters that are stored in the look-up table. If any parameter of the product image is outside of a range specified in the look-up table, and/or differs from an ideal value in the look-up table by more than a predefined amount, the parameter is considered to degrade the quality of the product image and/or be associated with low-market success. A recommendation is then generated to bring that parameter of the product image closer to the value stored in the look-up table. Referring to the look-up table 500 of FIG. 5 by way of example, if a product image for a coffee mug has an average image brightness of 39%, then the product image recommendations engine 402 could use the look-up table 500 to determine that the quality of the product image may be improved by increasing the brightness. As such, the product image recommendations engine 402 could generate a recommendation to increase camera sensitivity, increase aperture size, increase exposure time, reduce filtering, turn on the flash, use a brighter light source and/or use a lighter background. The choice between any and all of these recommendations could be made based on other parameters of the product image.

For a product image model that is in the form of a machine learning algorithm, step 710 includes inputting the parameters of the product image into the machine learning algorithm, and calculating, using the machine learning algorithm, a prediction of market success for the product image. In the case that the prediction of market success is below a predetermined threshold, for example, the machine learning algorithm could be used to help determine a recommendation for improving the market success of subsequent product images. The recommendation could be associated with an improvement to the initial prediction of the market success for the product image.

One option for generating the recommendation is to use the machine learning algorithm to search for a set of product image parameters that produce a suitable prediction of market success, or at least produce a better prediction of market success than the original baseline prediction. The search could include varying the inputs to the machine learning algorithm, or varying the properties of the machine learning algorithm itself to simulate changes to the inputs, and determining the effects of these changes on predicted market success.

In some implementations, the machine learning algorithm is or includes a neural network. In these implementations, step 710 could include determining a modification to the neural network that produces an improvement to the prediction of the market success of the particular product image, and generating the recommendation based on the modification to the neural network. For example, the coefficients at one or more nodes of the neural network can be changed, and the effect of those changes on predicted market success can be calculated. This process can be repeated to find a neural network that provides a suitable prediction of market success. The changes to the neural network can then be back propagated to determine parameters of a product image that are expected to have suitable market success, which can be translated into a recommendation for the merchant and/or the merchant device 430. To improve the efficiency of searching for the recommendation using the neural network, optimization techniques and algorithms may be applied.

Referring to the neural network 600 of FIG. 6 by way of example, the parameters of a product image could be used at the inputs 602, 604, 606, 608, 610, 612, 614, 616, and an indication of market success of the product image could be received at the output 618. To determine a new set of product image parameters that result in an improved prediction of market success, the variables at any or all of the nodes in the layer 620 could be varied, and the change at the output 618 could be measured. If a particular set of changes to the nodes in the layer 620 is found to produce an improved prediction of market success at the output 618, then these changes could be back propagated through the neural network 600 to determine a new set of inputs that are expected to produce this output. A recommendation can then be generated based on the new set of inputs, where the recommendation is intended to help produce a product image having these parameters.

In some implementations, the product image model 410 includes both a look-up table and a machine learning algorithm. In step 710, the machine learning algorithm analyses the parameters of a product image to determine whether or not the product image is expected to have suitable market success. If the product image is predicted to not have suitable market success, then the look-up table could be used to determine a recommendation for improving the market success of subsequent product images.

Step 710 could be performed by the product image recommendations engine 402 or by the merchant device 430. In implementations where the product image or the parameters of the product image were transmitted to the product image recommendations engine 402, then the processor 404, using the product image model 410, could generate the recommendation for modifying the product image. In some implementations, the memory 434 on the merchant device 430 stores the product image model 410, and the processor 432 generates the recommendation for modifying the product image locally. The product image model 410 could have been transmitted to the merchant device 430 via the network 426, or the merchant device could have generated the product image model at step 702, for example.

Step 712 includes instructing the merchant device 430 to display the recommendation on the merchant device. In some implementations, the recommendation is displayed in association with a product image. The recommendation can inform the merchant why the image is not high-quality and/or why the image is not predicted to be successful in the market, and teach the merchant how to generate improved images. In some cases, the recommendation could inform the merchant that the product image is in some way inconsistent with other product images used by the merchant. For example, if a merchant sells multiple different coffee mugs, and the product images for these coffee mugs use a particular background, then the recommendation that is generated for a product image of a new coffee mug could inform the merchant that the particular background should be used for consistency.

In step 712, words and/or symbols can be used to instruct the user to perform certain actions to generate higher-quality images. The recommendation can be overlaid or superimposed with the product image on the user device to help the user visualize the recommendation. In one example, the recommendation is that the product occupy a certain percentage of the viewing area or location in the viewing area, and the user device may be instructed to overlay a box on the merchant's display and ask the merchant to align the product within the box.

In some implementations, the merchant device 430 is instructed to display the recommendation while the product image that was obtained step 706 is also displayed on the merchant device. For example, the product image obtained in step 706 could be a still image that was captured by the merchant device 430. The recommendation and the still image could then be displayed together. The merchant can learn from the recommendation and proceed to capture a subsequent product image based on the recommendation.

In some implementations, the merchant device 430 is instructed to display the recommendation while a subsequent product image is displayed on the merchant device, the subsequent product image having also been captured by the merchant device. For example, a display in the merchant device 430 could act as a viewfinder that continuously updates based on what is being captured by the camera 436. A first product image is obtained in step 706, and a recommendation is generated based on this first product image. However, as the recommendation is being generated, the viewfinder could be updated and a second product image is displayed. The recommendation could then be displayed with the second product image in this viewfinder. The recommendation could also or instead be displayed side-by-side with the viewfinder. In some cases, the first and second product images could be similar or even nearly identical, and therefore the recommendation is still valid for the second product image. After a predetermined period of time, another recommendation could be generated based on the product image in the viewfinder. This is an example of actively or automatically providing product image recommendations, as recommendations are continuously generated or updated as the product images shown in the viewfinder of the merchant device 430 change.

As noted above, the recommendation could be generated remotely from the merchant device 430, at the product image recommendations engine 402. As such, in some implementations, step 712 includes transmitting the recommendation to the merchant device 430.

Figure 7:
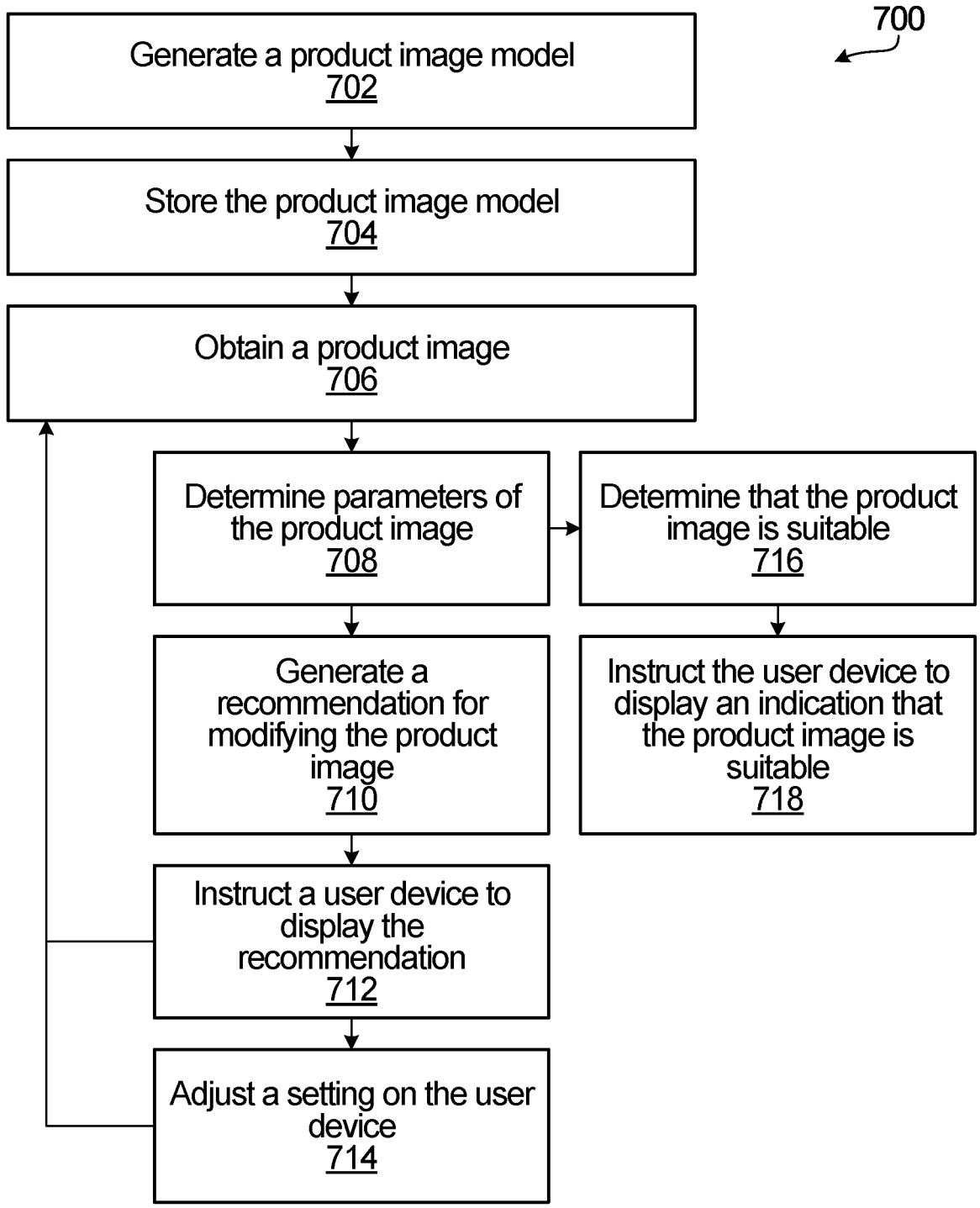
FIG. 7 is a flow diagram illustrating an example process for providing product image recommendations.

FIG. 7 illustrates that following step 712, the process 700 could return to step 706 where another product image is obtained. Alternatively, the process 700 could proceed to optional step 714, which includes instructing, based on the recommendation, the merchant device 430 to adjust a setting on the merchant device. For example, the merchant device 430 could be instructed to adjust a sensitivity, aperture size, exposure time, zoom setting, filtering and/or flash settings on the camera 436. This may occur automatically, with or without the merchant's knowledge. Following step 714, the process 700 may return to step 706.

In some cases, a product image obtained at step 706 may be determined to be high-quality and/or may produce a suitable prediction of market success by the product image model 410. Therefore, there may be no need to generate a recommendation at step 710. This may be the first product image that is obtained, or a subsequent product image that has been improved following the generation of one or more recommendations at step 710. In these cases, the process 700 could proceed to optional step 716 after step 708, rather than to step 710. Step 716 includes determining that the product image obtained at step 706 is suitable. This step is performed using the product image model 410 generated at step 702 and the parameters of the product image determined at step 708. For a product image model that is implemented in the form of a look-up table, step 716 could include determining that the parameters of the product image are inside of a range specified in the look-up table, and/or are proximate to an ideal value in the look-up table. For a product image model that is in the form of a machine learning algorithm, step 716 could include inputting the parameters of the product image into the machine learning algorithm, and calculating, using the machine learning algorithm, a prediction of market success of the particular product image that is above a predetermined threshold, for example.

Following step 716, the process 700 may then proceed to optional step 718, which includes instructing the merchant device 430 to display, on the merchant device, an indication that the second product image is suitable. Such an indication could include text and/or symbols that inform the merchant that the product image is suitable.

In some implementations, step 718 may instead (or additionally) include instructing the merchant device 430 to automatically take the photograph, so that the merchant does not have to manually take the photograph. In this way, the merchant device 430 may operate in a mode in which the merchant is instructed to make modifications (as needed) until it is determined that the product image is suitable, at which time the camera may automatically take the picture for the merchant.

It should be noted that the system 400 is just one example of a system capable of implementing the process 700. In general, the process 700 could also be implemented using other systems. While the description of the process 700 has been described in association with a merchant using a merchant device, it should be noted that this process could be performed with any user and user device.

The order of the steps 702, 704, 706, 708, 710, 712, 714, 716, 718 illustrated in FIG. 7 is provided by way of example. In general, the embodiments provided herein are not limited to any particular order of the steps 702, 704, 706, 708, 710, 712, 714, 716, 718. For example, storing the product image model at step 704 could be performed after or even simultaneously with obtaining a product image.

In some embodiments, a recommendation could be generated at step 710 before a product image is obtained at step 706. For example, if the product image recommendations engine 402 determines that a merchant is about to capture an image of a coffee mug (e.g., based on a prior entry of a product description of a coffee mug), the product image recommendations engine could generate preliminary recommendations for the merchant based on values stored in a look-up table. The merchant could learn from these recommendations before taking an image of the coffee mug.

Example User Interfaces for Product Image Recommendations

FIGS. 8 to 15 illustrate screen pages according to embodiments of the present disclosure. Any or all of the screen pages could be shown on a display of a user device, such as the merchant device 430 of FIG. 4. Examples of screen pages include webpages and pages accessed through mobile applications.

Figure 8:
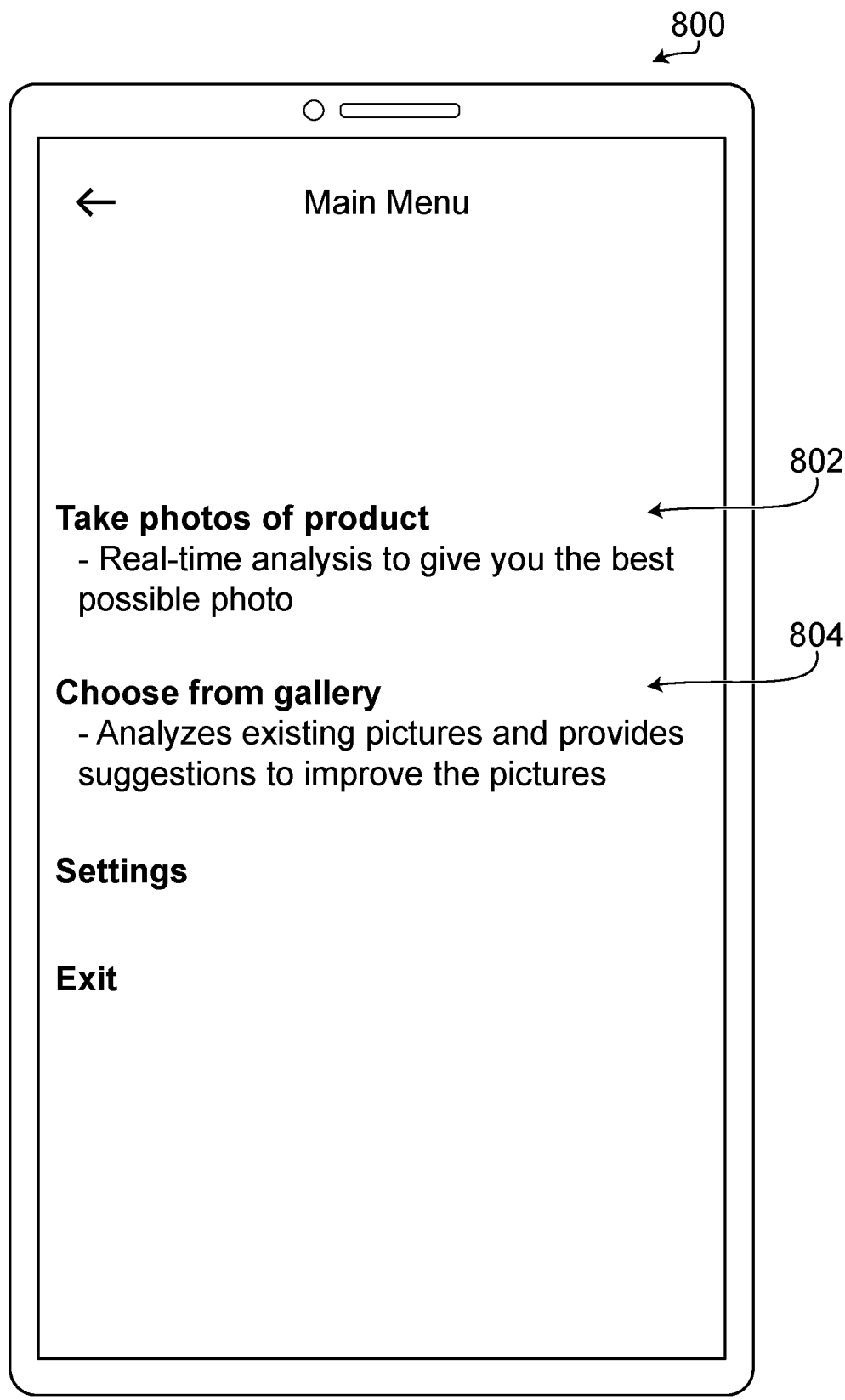
FIGS. 8 to 15 illustrate screen pages according to embodiments of the present disclosure.

FIG. 8 illustrates an example screen page 800 that illustrates a main menu for product image recommendations on a user device. The screen page 800 could be provided by a program or application that is running on a merchant device. The program could provide product image recommendations, and possibly also coordinate the upload of product images to a merchant's online store, for example. In some implementations, the screen page 800 could be accessed via a merchant's home page on an e-commerce platform. An example of such a home page is provided in FIG. 2. The screen page 800 presents a user with an option 802 to capture a photograph of a product, and another option 804 to choose a previously captured photograph from a gallery.

Figure 9:
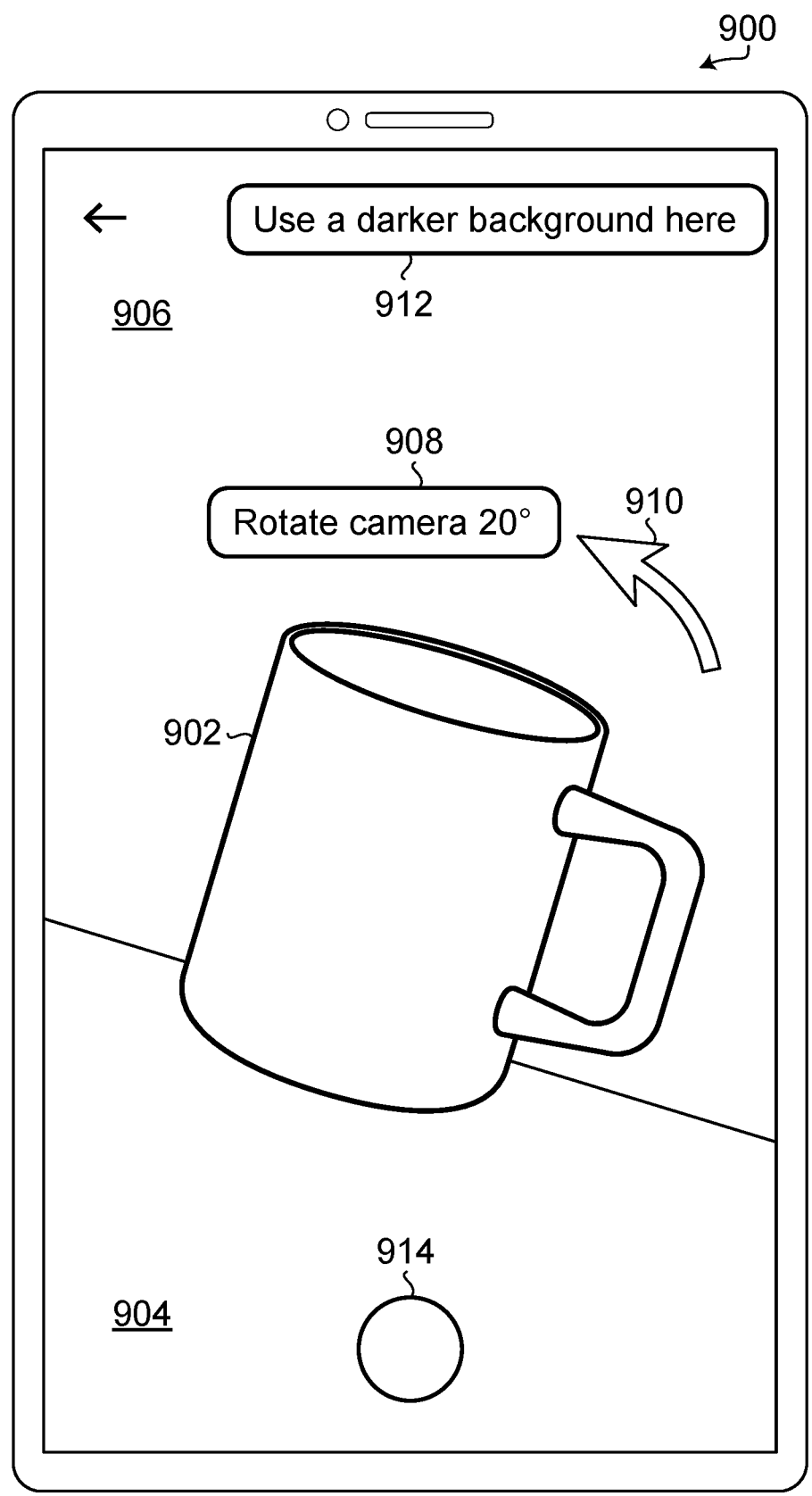

Upon selection of option 802, the user device could display product image recommendations simultaneously with a product image obtained from a camera. FIG. 9 illustrates an example screen page 900 that displays multiple recommendations 908, 910, 912 simultaneously with a product image.

The screen page 900 includes a viewfinder of a camera. The camera is being used to capture an image of a coffee mug 902, which is resting on a surface 904 in front of a background 906. The screen page 900 also includes a button 914 that allows the user to capture and save the image that is shown in the screen page 900. The recommendations 908, 910, 912 are overlaid or superimposed with the product image to help a user better visualize the recommendations.

The recommendations 908, 910 relate to rotating the camera relative to the coffee mug 902 by 20°. Specifically, the recommendation 908 includes text that instructs the user to rotate the camera by 20°, and the recommendation 910 is an arrow to help the user visualize how the camera should be rotated. These recommendations could be generated by a product image model that analyses a product image and determines that the coffee mug 902 and the surface 904 are tilted relative to horizontal by approximately 20°.

The recommendation 912 includes text that instructs the user to user a darker background. The recommendation 912 could be generated after a product image model determines that the contrast between the coffee mug 902 and the background 906 is too low, or that the average brightness of the product image is too high.

In some implementations, either or both of the recommendations 908, 912 could include text that indicates the recommendation is being made for consistency with other product images used by the user. For example, the recommendation 908 could instead state, "rotate the camera by 20° to match the angle you have used in the past for your other pictures".

It should be noted that the recommendations 908, 910, 912 might not have been generated based on the exact product image that is shown in the screen page 900. Since the screen page 900 is a viewfinder that is being continuously updated, the generation of the recommendations 908, 910, 912 could have been based on a previous product image, but by the time that the recommendations were actually generated, another product image is shown in the viewfinder. However, in this case, there is little variation between the product images. As such, the recommendations 908, 910, 912 are still valid for the product image shown in the screen page 900.

Figure 10:
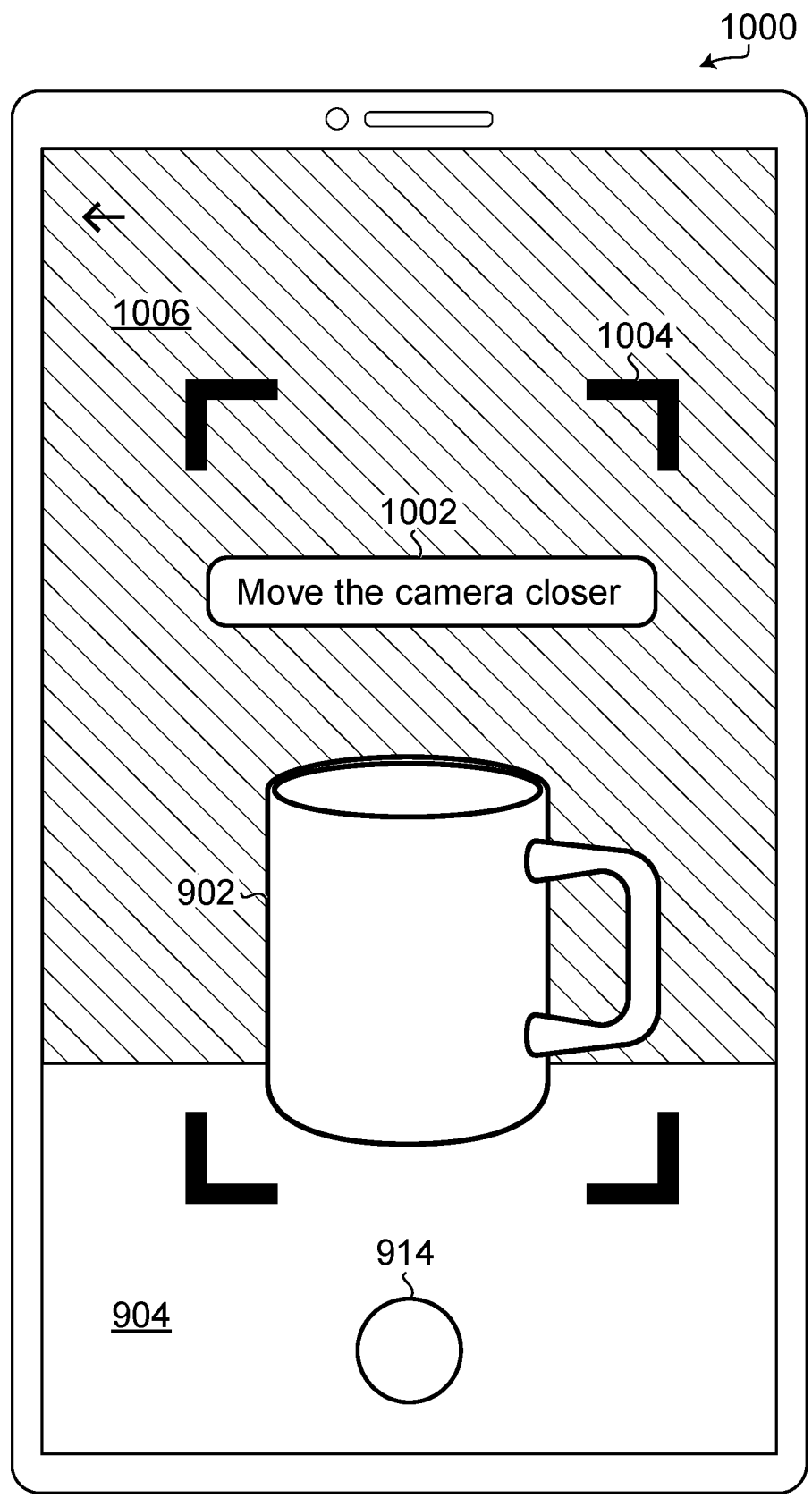

Based on the recommendations 908, 910, 912, the user could modify the product image by reorienting the camera and changing the background. Recommendations are then actively updated when a new product image is obtained by the user device. The new product image is shown in FIG. 10. FIG. 10 illustrates another screen page 1000 that displays multiple product image recommendations 1002, 1004 simultaneously with a product image. This product image in the screen page 1000 differs from the product image in the screen page 900 in that the camera has been reoriented such that the coffee mug 902 and the surface 904 are now level, and the background 906 has been replaced with a darker background 1006. These differences have resulted in the recommendations 908, 910, 912 being removed, as the tilt of the coffee mug 902, contrast, and average brightness of the product image are no longer parameters that degrade the quality of the product image.

The new recommendations 1002, 1004 relate to the size of the coffee mug 902 in the product image. For example, it could have been determined using a product image model that the coffee mug occupies too few pixels of the product image. The recommendation 1002 includes text instructing a user to move the camera closer to the coffee mug 902. The recommendation 1004 includes a box or outline that helps the user visualize the ideal size of the coffee mug 902 in the product image. A user could move the camera closer to the coffee mug 902 until the mug fills the box.

Figure 11:
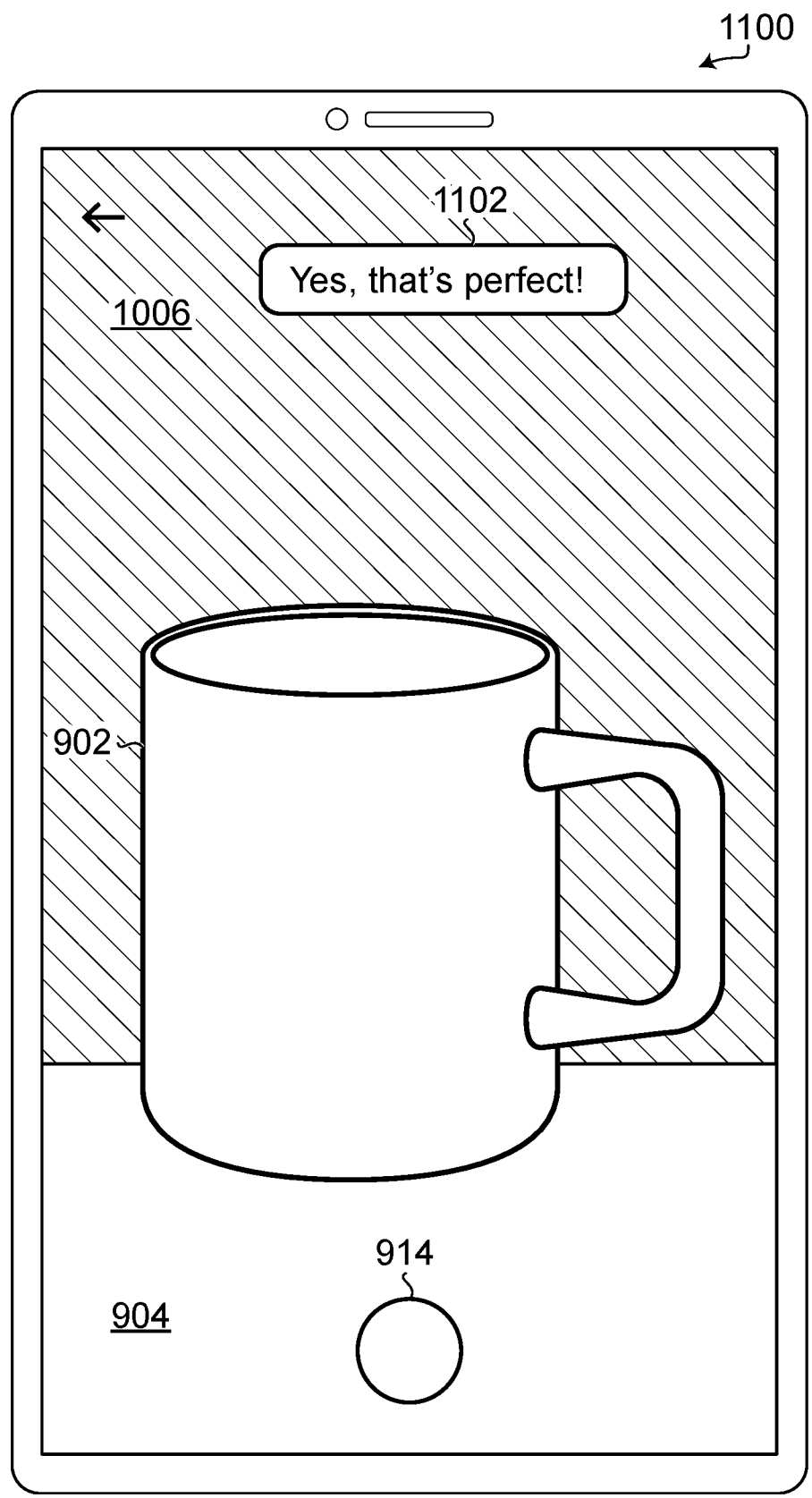

FIG. 11 illustrates a further screen page 1100 including an indication 1102 that the product image being captured by the camera is suitable. For example, the product image shown in the screen page 1100 could produce a relatively high prediction of market success using a product image model. The screen page 1100 therefore does not illustrate any recommendations. When presented with the screen page 1100, a user could be encouraged to capture a product image using the button 914. The product image could then be used to present the coffee mug 902 in an online store, for example.

Referring again to FIG. 8, when option 804 is selected, a user device could access a gallery of product images that is stored on the user device or elsewhere. A product image from the gallery could then be selected, and recommendations could be generated based on the product image.

Figure 12:
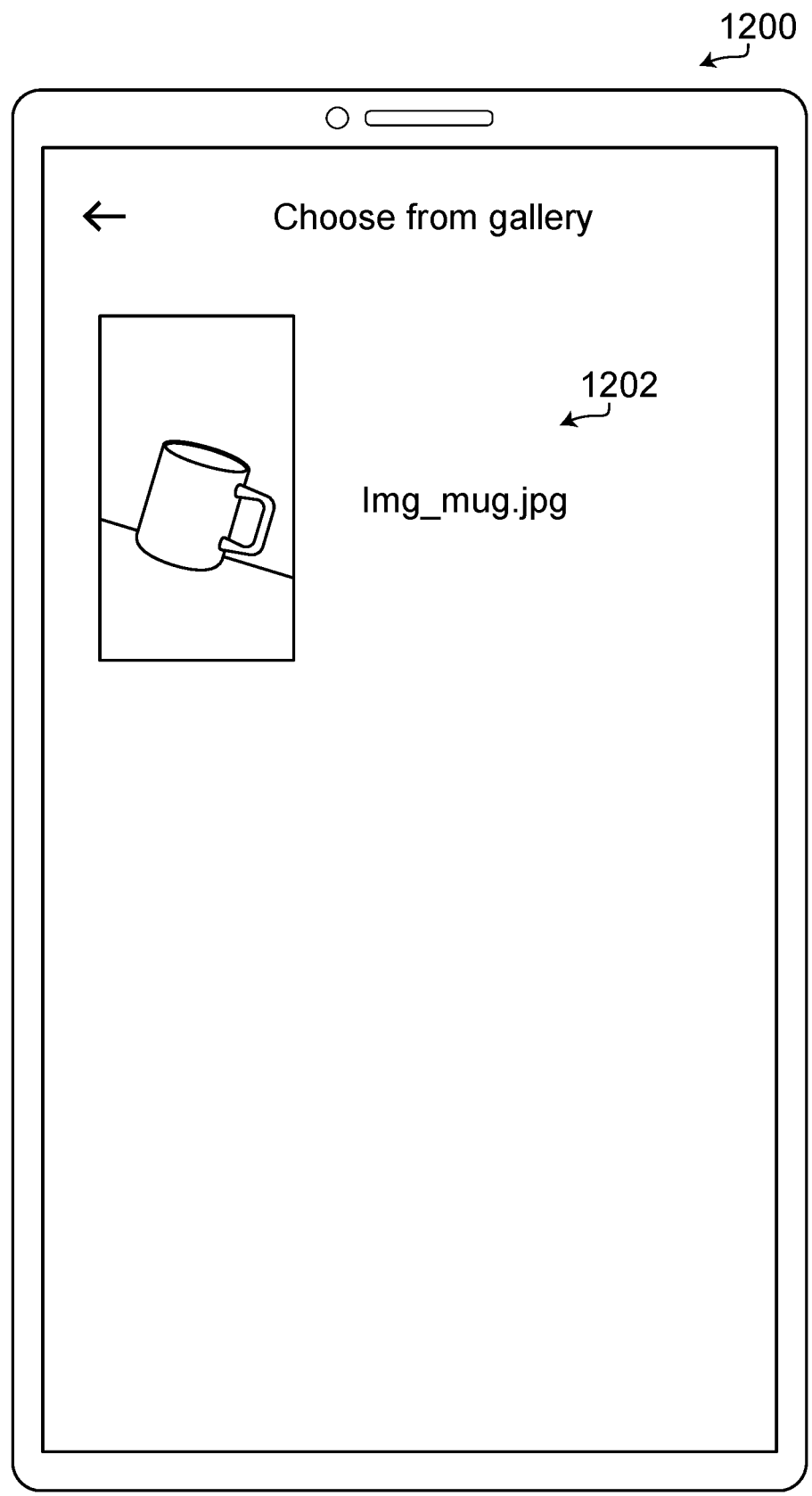

FIG. 12 illustrates a screen page 1200 that displays images saved to a gallery. A user could be directed to the screen page 1200 upon selection of the option 804 in the screen page 800, for example. The screen page 1200 includes one product image 1202 of a coffee mug. Notably, this is the same product image that was shown in the screen page 900 of FIG. 9. One product image is shown in the screen page 1200 by way of example, and in general more than one product image could be stored in the gallery.

Figure 13:
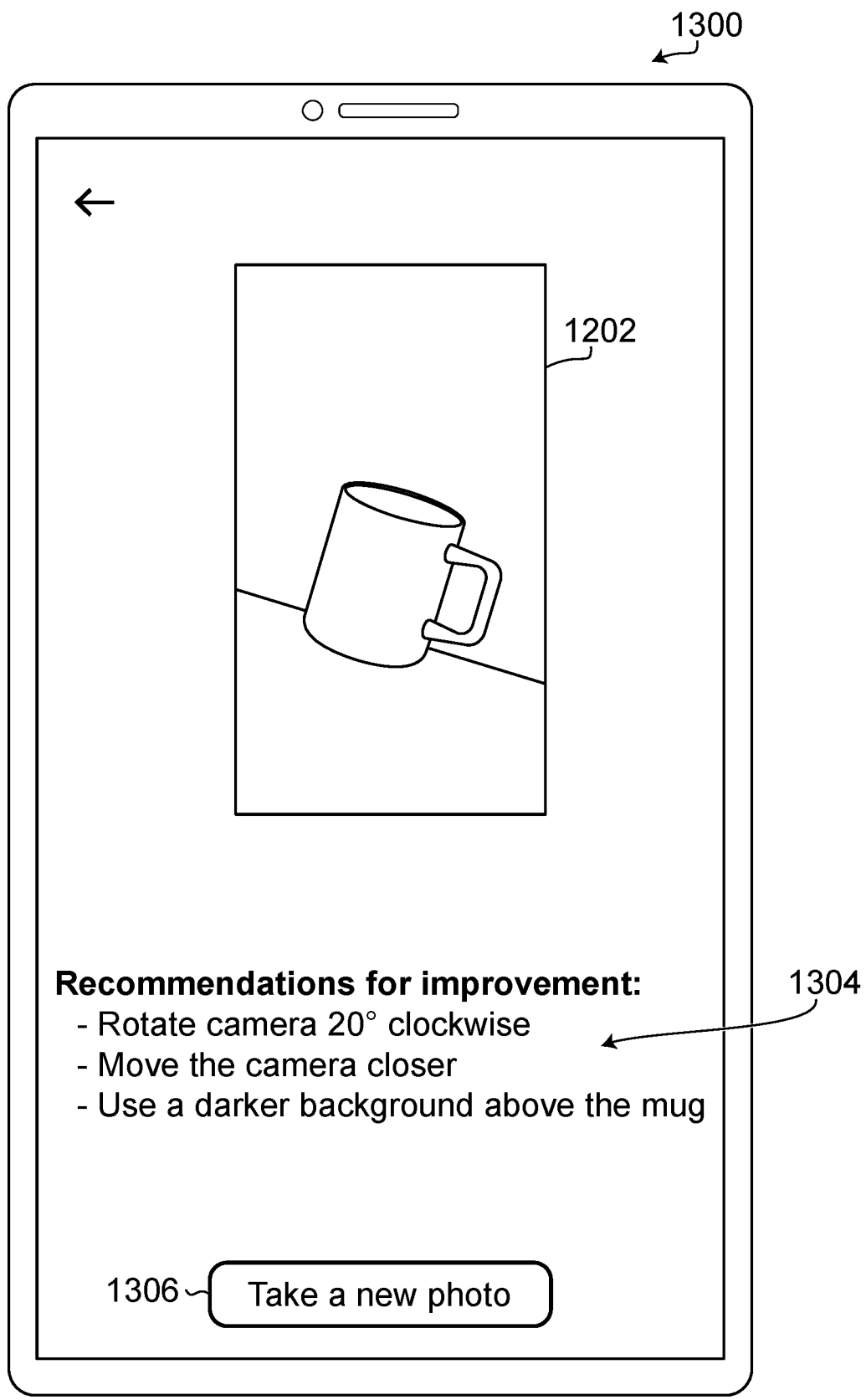

When a user selects the product image 1202 they could be directed to a screen page 1300 shown in FIG. 13. The screen page 1300 displays multiple recommendations 1304 simultaneously with the product image 1202. The recommendations 1304 are shown underneath the product image 1202. The recommendations 1304 include instructions for a user to rotate the camera 20° clockwise, move the camera closer to the coffee mug, and use a darker background above the coffee mug. The user could learn from these recommendations before capturing another product image. The screen page 1300 displays a button 1306 to enable a user to take another product image. Selecting the button 1306 could direct the user to a program or application that interfaces with a camera to take the product image.

Figure 14:
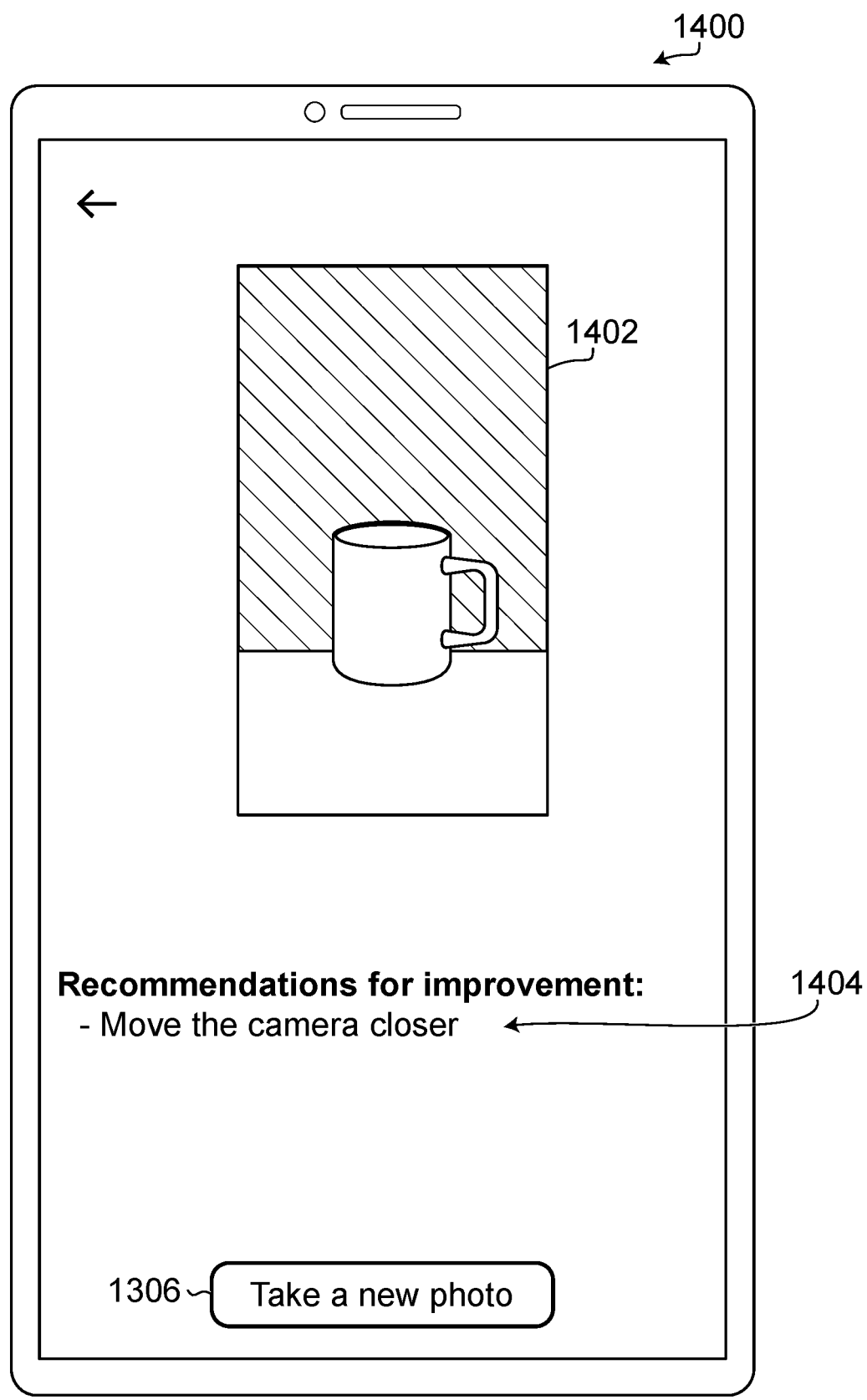

After another product image is taken, the image may automatically be analysed by a product image model. Alternatively, a user could return to the screen page 1200 and select the new product image. FIG. 14 illustrates a screen page 1400 with a new product image 1402, and an updated set of recommendations 1404. The product image 1402 is the same as the product image shown in the screen page 1000. The recommendations 1404 only include an instruction to move the camera closer to the coffee mug. The previous set of recommendations 1304 could have been followed when the user captured the product image 1402. The user could select the button 1306 in the screen page 1400 to capture another product image, taking into account the recommendations 1404.

Figure 15:
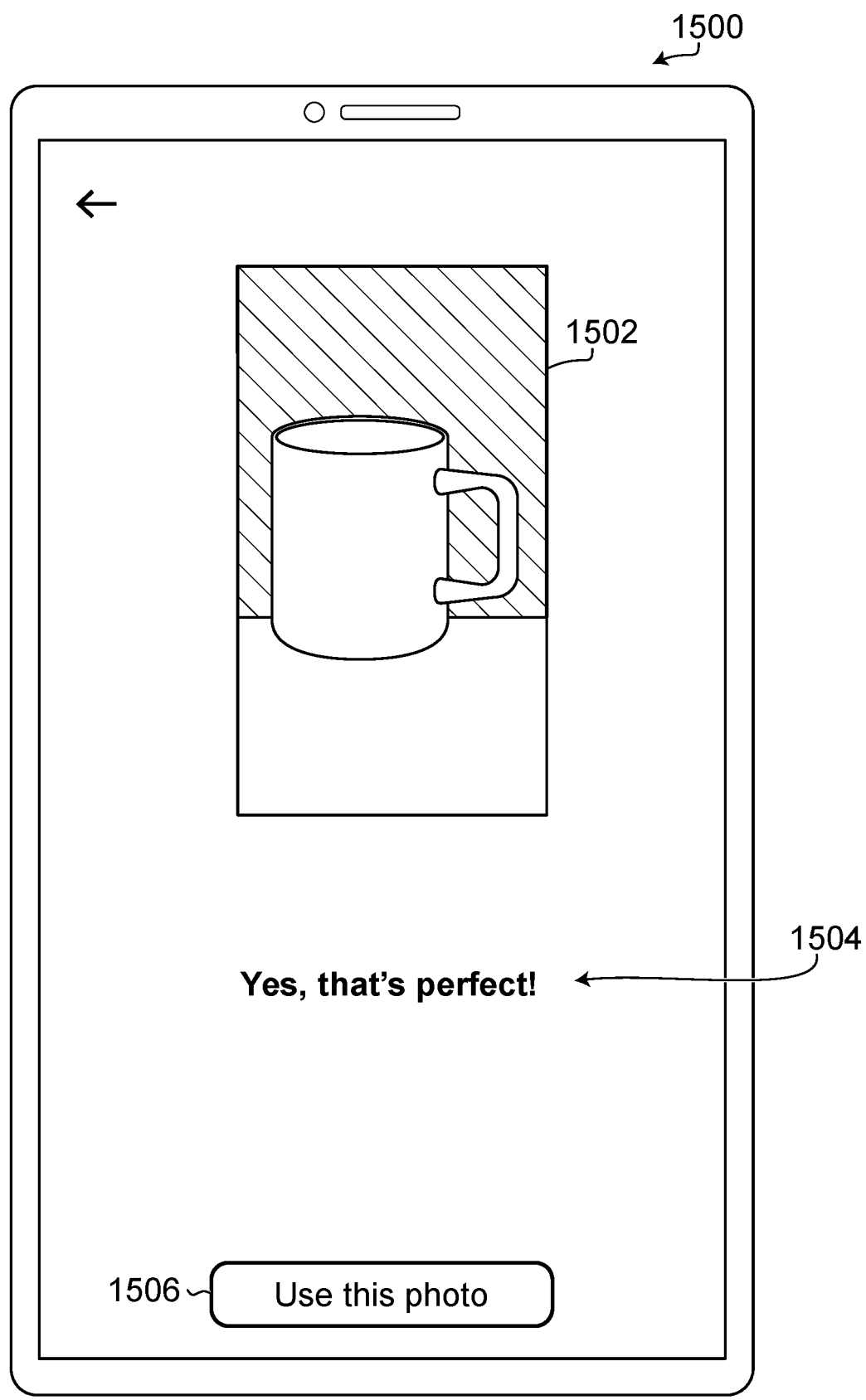

FIG. 15 illustrates a screen page 1500 with a further product image 1502 and an indication 1504 that the product image 1502 is suitable. A button 1506 is also provided to allow the user to select the product image 1502 as a final product image for display in an online store, for example.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
obtaining a first product image captured by a user device, the first product image having a resolution less than a particular resolution achievable by the user device;
obtaining data indicating a capability of the user device, the data including an indication of the particular resolution achievable by the user device;
determining particular parameters of the first product image, wherein determining the particular parameters of the first product image includes determining a parameter of the first product image based on the particular resolution achievable by the user device that is higher than the resolution of the first product image;
generating, based on the particular parameters, a recommendation for capturing a further product image with the user device; and
instructing, based on the recommendation, the user device to display at least a portion of the recommendation in a viewfinder on the user device and automatically adjust a setting used for capturing the further product image by the user device.

2. The computer-implemented method of claim 1, wherein the setting automatically adjusted includes at least one of: a sensitivity of a camera of the user device, an aperture size of the camera of the user device, an exposure time of the camera of the user device, a zoom setting of the camera of the user device, a filtering performed by the user device, and/or a flash setting of the camera of the user device.

3. The computer-implemented method of claim 1, wherein the recommendation displayed is in the form of a user notification.

4. The computer-implemented method of claim 1, further comprising instructing the user device to automatically take a picture to capture the further product image.

5. The computer-implemented method of claim 1, wherein the particular resolution is the resolution at which a picture is taken by a camera of the user device.

6. The computer-implemented method of claim 5, wherein the particular resolution is the true resolution of the camera.

7. The computer-implemented method of claim 1, wherein the recommendation is generated based on both the particular parameters and a model that relates parameters of a product image to market success of the product image.

8. The computer-implemented method of claim 7, wherein the model is implemented using a machine learning algorithm, and generating the recommendation comprises:
inputting the particular parameters into the machine learning algorithm; and
calculating, using the machine learning algorithm, a prediction of market success of the first product image, wherein the recommendation is associated with an improvement to the prediction of the market success of the first product image.

9. The computer-implemented method of claim 1, wherein determining the particular parameters of the first product image comprises performing image analysis on the first product image.

10. A system comprising:
a processor; and
a memory storing processor-executable instructions that, when executed, cause the processor to:
obtain a first product image captured by a user device, the first product image having a resolution less than a particular resolution achievable by the user device;
obtain data indicating a capability of the user device, the data including an indication of the particular resolution achievable by the user device;
determine particular parameters of the first product image, wherein determining the particular parameters of the first product image includes determining a parameter of the first product image based on the particular resolution achievable by the user device that is higher than the resolution of the first product image;
generate, based on the particular parameters, a recommendation for capturing a further product image with the user device; and
instruct, based on the recommendation, the user device to display at least a portion of the recommendation in a viewfinder on the user device and automatically adjust a setting used for capturing the further product image by the user device.

11. The system of claim 10, wherein the setting automatically adjusted includes at least one of: a sensitivity of a camera of the user device, an aperture size of the camera of the user device, an exposure time of the camera of the user device, a zoom setting of the camera of the user device, a filtering performed by the user device, and/or a flash setting of the camera of the user device.

12. The system of claim 10, wherein the recommendation displayed is in the form of a user notification.

13. The system of claim 10, wherein the processor is to instruct the user device to automatically take a picture to capture the further product image.

14. The system of claim 10, wherein the particular resolution is the resolution at which a picture is taken by a camera of the user device.

15. The system of claim 10, wherein the recommendation is generated based on both the particular parameters and a model that relates parameters of a product image to market success of the product image.

16. The system of claim 15, wherein the model is implemented using a machine learning algorithm, and generating the recommendation comprises:
inputting the particular parameters into the machine learning algorithm; and
calculating, using the machine learning algorithm, a prediction of market success of the first product image, wherein the recommendation is associated with an improvement to the prediction of the market success of the first product image.

17. The system of claim 10, wherein determining the particular parameters of the first product image comprises performing image analysis on the first product image.

18. A non-transitory computer readable medium having stored thereon computer-executable instructions that, when executed by a computer, cause the computer to perform operations comprising:
obtaining a first product image captured by a user device, the first product image having a resolution less than a particular resolution achievable by the user device;
obtaining data indicating a capability of the user device, the data including an indication of the particular resolution achievable by the user device;
determining particular parameters of the first product image, wherein determining the particular parameters of the first product image includes determining a parameter of the first product image based on the particular resolution achievable by the user device that is higher than the resolution of the first product image;
generating, based on the particular parameters, a recommendation for capturing a further product image with the user device; and
instructing, based on the recommendation, the user device to display at least a portion of the recommendation in a viewfinder on the user device and automatically adjust a setting used for capturing the further product image by the user device.

19. The non-transitory computer readable medium of claim 18, wherein the setting automatically adjusted includes at least one of: a sensitivity of a camera of the user device, an aperture size of the camera of the user device, an exposure time of the camera of the user device, a zoom setting of the camera of the user device, a filtering performed by the user device, and/or a flash setting of the camera of the user device.

20. The non-transitory computer readable medium of claim 19, wherein the recommendation displayed is in the form of a user notification.

* * * * *